US009973567B2

United States Patent
Chen et al.

(10) Patent No.: US 9,973,567 B2
(45) Date of Patent: May 15, 2018

(54) SYSTEM AND METHOD FOR TERMINAL MANAGEMENT IN A HOME NETWORK USING A VIRTUAL CLIENT

(71) Applicant: Huawei Device (Dongguan) Co., Ltd., Dongguan (CN)

(72) Inventors: Xinmiao Chen, Shenzhen (CN); Junjie Zhao, Shenzhen (CN); Yu Zhu, Shenzhen (CN); Qinliang Zhang, Shenzhen (CN)

(73) Assignee: Huawei Device (Dongguan) Co., Ltd., Dongguan (CN)

( * ) Notice: Subject to any disclaimer, the term of this patent is extended or adjusted under 35 U.S.C. 154(b) by 591 days.

(21) Appl. No.: 14/583,423

(22) Filed: Dec. 26, 2014

(65) Prior Publication Data

US 2015/0113052 A1 Apr. 23, 2015

Related U.S. Application Data

(63) Continuation of application No. PCT/CN2013/085077, filed on Oct. 12, 2013.

(30) Foreign Application Priority Data

Nov. 29, 2012 (CN) .......................... 2012 1 0498875

(51) Int. Cl.
*G06F 13/00* (2006.01)
*H04L 29/08* (2006.01)
(Continued)

(52) U.S. Cl.
CPC .......... *H04L 67/10* (2013.01); *H04L 12/2834* (2013.01); *H04L 41/022* (2013.01);
(Continued)

(58) Field of Classification Search
CPC ..... G06Q 30/02; H04L 12/2602; H04L 29/06; H04L 29/0809; H04L 29/06047;
(Continued)

(56) References Cited

U.S. PATENT DOCUMENTS

| | | | |
|---|---|---|---|
| 2009/0100176 A1* | 4/2009 | Hicks, III | ............... G06F 15/16 709/224 |
| 2009/0100460 A1* | 4/2009 | Hicks, III | ............ H04H 20/106 725/35 |

(Continued)

FOREIGN PATENT DOCUMENTS

| | | |
|---|---|---|
| CN | 1481119 A | 3/2004 |
| CN | 101141418 A | 3/2008 |

(Continued)

OTHER PUBLICATIONS

2WIRE, "iNID—i3812V User Guide" (5100-000725-000 Rev 000) pp. 1-128 dated: 2009.*

(Continued)

*Primary Examiner* — Robert B Harrell
(74) *Attorney, Agent, or Firm* — Slater Matsil, LLP

(57) ABSTRACT

A gateway Auto-Configuration Server (ACS) generates a service template according to service server information received from a service server, where the service template includes a first application identifier corresponding to an application service; a home gateway acquires the service template from the gateway ACS, and creates a virtual client for the application service corresponding to the first application identifier, and when an application service corresponding to a second application identifier acquired from a terminal belongs to the application service corresponding to the first application identifier, maps information corresponding to the second application identifier, to the virtual client corresponding to the first application identifier, and the virtual client implements message exchange between the
(Continued)

service server corresponding to the first application identifier and the terminal.

20 Claims, 9 Drawing Sheets

(51) Int. Cl.
　　　*H04L 29/06*　　　(2006.01)
　　　*H04L 12/28*　　　(2006.01)
　　　*H04W 4/00*　　　(2018.01)
　　　*H04W 84/12*　　　(2009.01)
　　　*H04L 12/24*　　　(2006.01)
(52) U.S. Cl.
　　　CPC .......... *H04L 67/16* (2013.01); *H04L 67/2809* (2013.01); *H04L 67/42* (2013.01); *H04L 41/0206* (2013.01); *H04W 4/006* (2013.01); *H04W 4/38* (2018.02); *H04W 84/12* (2013.01)
(58) Field of Classification Search
　　　CPC ... H04L 29/08072; H04L 41/22; H04L 43/00; H04L 12/2834; H04L 41/0206; H04L 67/10; H04L 67/16; H04L 67/42; H04L 67/2809; H04W 4/006; H04W 4/38; H04W 84/12; H04N 21/812; H04N 21/25883; H04N 7/165; H04N 21/25891; H04N 21/4532; H04H 20/106
　　　USPC .................................. 709/203, 224; 725/35
　　　See application file for complete search history.

(56) References Cited

U.S. PATENT DOCUMENTS

2010/0202450 A1　　8/2010　Ansari et al.
2011/0276668 A1　　11/2011　Fang et al.

FOREIGN PATENT DOCUMENTS

| CN | 101667926 A | 3/2010 |
| CN | 101783736 A | 7/2010 |
| CN | 102469131 A | 5/2012 |
| WO | 2012109531 A2 | 8/2012 |

OTHER PUBLICATIONS

"Remote Management of Non TR-069 Devices," PD-174 Revision 16, Broadband Forum Proposed Draft BBF2008.040.16, Revision Date Dec. 2010, 102 pages.
"CPE WAN Management Protocol," TR-069 Issue 1 Amendment 4, Broadband Forum Technical Report, Issue Date: Jul. 2011, Protocol Version: 1.3, 190 pages.

* cited by examiner

US 9,973,567 B2

SYSTEM AND METHOD FOR TERMINAL MANAGEMENT IN A HOME NETWORK USING A VIRTUAL CLIENT

This application is a continuation of International Application No. PCT/CN2013/085077, filed on Oct. 12, 2013, which claims priority to Chinese Patent Application No. CN 201210498875.X, filed on Nov. 29, 2012, both of which are hereby incorporated by reference in their entireties.

TECHNICAL FIELD

The present invention relates to communications technologies, and in particular, to a method for terminal management in a home network, a device, and a home network.

BACKGROUND

The Digital Subscriber Line (DSL) is a broadband access technology, and is currently applied extensively in home networks for broadband access. A TR-069 standard of the Broadband Forum defines a TR-069 terminal and a method for remotely managing a TR-069 terminal by an operator. With development of a home network technology, a non-TR-069 terminal, for example, a ZigBee® device, which needs to be remotely managed by the operator, also emerges in a home network.

Currently, a method for managing a non-TR-069 terminal in a home network is defined in a PD-174 standard of the Broadband Forum. By using a virtual device mechanism, a home gateway acts as a proxy to create an independent virtual TR-069 client for a proxied non-TR-069 terminal, and a service server manages the corresponding terminal by operating the virtual TR-069 client. By using an embedded object mechanism, the home gateway acts as a proxy to generate, in a data model of the home gateway, a data model for the proxied non-TR-069 terminal, and an Auto-Configuration Server (ACS) manages the corresponding terminal by operating the data model of the gateway.

By using the foregoing method for terminal management as defined in the PD-174 standard, the proxied non-TR-069 terminal can accept management by only one service server. However, in the home network, a non-TR-069 terminal (for example, a ZigBee® device) is required to concurrently implement multiple applications, and therefore, multiple service servers are required to manage the terminal. The conventional method for terminal management in the home network cannot be used to implement management of the terminal by multiple service servers.

SUMMARY

An aspect of the present invention provides a method for terminal management in a home network, for solving disadvantages of the prior art and implementing management of a terminal by multiple service servers.

Another aspect of the present invention provides a device for terminal management in a home network, for solving disadvantages of the prior art and implementing management of a terminal by multiple service servers.

Still another aspect of the present invention provides a home network, for solving disadvantages of the prior art and implementing management of a terminal by multiple service servers.

An aspect of the present invention provides a method for terminal management in a home network. The method includes acquiring a service template from a gateway auto-configuration server ACS, where the service template includes a first application identifier; creating, according to the service template, a virtual client for an application service corresponding to the first application identifier; when an application service corresponding to a second application identifier acquired from a terminal belongs to the application service corresponding to the first application identifier, mapping information corresponding to the second application identifier, to the virtual client corresponding to the first application identifier; and implementing, by the virtual client, message exchange between a service server corresponding to the first application identifier and the terminal.

With reference to the foregoing aspect an implementation manner is further provided, where, after the acquiring a service template from a gateway auto-configuration server ACS and before the creating, according to the service template, a virtual client for an application service corresponding to the first application identifier, or after the creating, according to the service template, a virtual client for an application service corresponding to the first application identifier, the method further includes: acquiring description information from the terminal, where the description information includes the second application identifier; and determining whether the application service corresponding to the second application identifier belongs to the application service corresponding to the first application identifier; or before the creating, according to the service template, a virtual client for an application service corresponding to the first application identifier, the method further includes: acquiring description information from the terminal, where the description information includes the second application identifier; and after the creating, according to the service template, a virtual client for an application service corresponding to the first application identifier, the method further includes: determining whether the application service corresponding to the second application identifier belongs to the application service corresponding to the first application identifier.

With reference to the foregoing aspect and any one possible implementation manner, an implementation manner is further provided, where the service template further includes: a uniform resource locator URL of the service server corresponding to the first application identifier, and a user name and password of a corresponding connection request.

With reference to the foregoing aspect and any one possible implementation manner, an implementation manner is further provided, where the terminal includes a ZigBee® device; the description information of the terminal includes: a node description file and at least one brief description file, where the brief description file includes the second application identifier; and the acquiring description information from the terminal includes: acquiring the description information of the terminal from the terminal by using a command of a service discovery function.

With reference to the foregoing aspect and any one possible implementation manner, an implementation manner is further provided, where the implementing, by the virtual client, message exchange between the service server corresponding to the first application identifier and the terminal includes: sending, by the virtual client, a message indicating that the virtual client is online, to the service server corresponding to the first application identifier; receiving, by the virtual client, a command request message delivered by the service server corresponding to the first application identifier, and after performing protocol conversion on the command request message, sending the command request message to the terminal, so that the terminal executes a command in the command request message and returns a command response message to the corresponding virtual client; and receiving, by the virtual client, the command response message returned by the terminal, and after performing protocol conversion on the command response message, sending the command response message to the service server corresponding to the first application identifier.

With reference to the foregoing aspect and any one possible implementation manner, an implementation manner is further provided, where the terminal includes a ZigBee® device; the description information of the terminal includes: a node description file and at least one brief description file, where the brief description file includes the second application identifier; and the acquiring description information from the terminal includes acquiring the description information of the terminal from a ZigBee® gateway, where the description information of the terminal is uploaded to the ZigBee® gateway by using a ZigBee® device profile ZDP command when the terminal joins a ZigBee® network; or invoking a device discovery report function of a ZigBee® gateway, so that the ZigBee® gateway acquires and returns the description information of the terminal.

With reference to the foregoing aspect and any one possible implementation manner, an implementation manner is further provided, where, the implementing, by the virtual client, message exchange between the service server corresponding to the first application identifier and the terminal includes: sending, by the virtual client, a message indicating that the virtual client is online, to the service server corresponding to the first application identifier; receiving, by the virtual client, a command request message delivered by the service server corresponding to the first application identifier, and forwarding the command request message to the ZigBee® gateway, so that the ZigBee® gateway sends, after performing protocol conversion on the command request message, the command request message to the terminal, so that the terminal executes a command in the command request message and returns a command response message to the ZigBee® gateway, so that the ZigBee® gateway sends, after performing protocol conversion on the command response message, the command response message to the corresponding virtual client; and receiving, by the virtual client, the command response message returned by the ZigBee® gateway, and forwarding the command response message to the corresponding service server.

Another aspect of the present invention provides a method for terminal management in a home network, where the method includes: receiving service server information sent by a service server, where the service server is corresponding to one application service; generating a service template according to the service server information, where the service template includes a first application identifier; and sending the service template to a home gateway, so that the home gateway creates, according to the service template, a virtual client for the application service corresponding to the first application identifier and when an application service corresponding to a second application identifier acquired from a terminal belongs to the application service corresponding to the first application identifier, maps information corresponding to the second application identifier, to the virtual client corresponding to the first application identifier, where the virtual client on the home gateway implements message exchange between the service server corresponding to the first application identifier and the terminal.

Still another aspect of the present invention provides a home gateway, including: a first acquiring unit, configured to acquire a service template from a gateway auto-configuration server ACS, where the service template includes a first application identifier; a second acquiring unit, configured to acquire a second application identifier from a terminal; and a client unit, configured to create, according to the service template from the first acquiring unit, a virtual client for an application service corresponding to the first application identifier, and when an application service corresponding to the second application identifier from the second acquiring unit belongs to the application service corresponding to the first application identifier, map information corresponding to the second application identifier, to the virtual client corresponding to the first application identifier, where the virtual client implements message exchange between a service server corresponding to the first application identifier and the terminal.

With reference to the foregoing aspect and any one possible implementation manner, an implementation manner is further provided, where the second acquiring unit is specifically configured to acquire description information from the terminal, where the description information includes the second application identifier.

With reference to the foregoing aspect and any one possible implementation manner, an implementation manner is further provided, where the service template further includes: a uniform resource locator URL of the service server corresponding to the first application identifier, and a user name and password of a corresponding connection request.

With reference to the foregoing aspect and any one possible implementation manner, an implementation manner is further provided, where the terminal includes a ZigBee® device; the description information of the terminal includes: a node description file and at least one brief description file, where the brief description file includes the second application identifier; and the second acquiring unit is specifically configured to acquire the description information of the terminal from the terminal by using a command of a service discovery function.

With reference to the foregoing aspect and any one possible implementation manner, an implementation manner is further provided, where the client unit is specifically configured to cause the virtual client to send a message indicating that the virtual client is online, to the corresponding service server; cause the virtual client to receive a command request message delivered by the corresponding service server and after performing protocol conversion on the command request message, send the command request message to the terminal, so that the terminal executes a command in the command request message and returns a command response message to the corresponding virtual client on the home gateway; and cause the virtual client to receive the command response message returned by the terminal and after performing protocol conversion on the command response message, send the command response message to the corresponding service server.

With reference to the foregoing aspect and any one possible implementation manner, an implementation manner is further provided, where the terminal includes a ZigBee® device; the description information of the terminal includes: a node description file and at least one brief description file, where the brief description file includes the second application identifier; and the second acquiring unit is specifically configured to acquire the description information of the terminal from a ZigBee® gateway, where the description information of the terminal is uploaded to the ZigBee® gateway by using a ZigBee® device profile ZDP command when the terminal joins a ZigBee® network; or the second acquiring unit is specifically configured to invoke a device discovery report function of a ZigBee® gateway, so that the ZigBee® gateway acquires and returns the description information of the terminal.

With reference to the foregoing aspect and any one possible implementation manner, an implementation manner is further provided, where the client unit is specifically configured to cause the virtual client to send a message indicating that the virtual client is online, to the corresponding service server; cause the virtual client to receive a command request message delivered by the corresponding service server and forward the command request message to the ZigBee® gateway, so that the ZigBee® gateway sends, after performing protocol conversion on the command request message, the command request message to the terminal, so that the terminal executes a command in the command request message and returns a command response message to the ZigBee® gateway, so that the ZigBee® gateway sends, after performing protocol conversion on the command response message, the command response message to the corresponding virtual client on the home gateway; and cause the virtual client to receive the command response message returned by the ZigBee® gateway and forward the command response message to the corresponding service server.

Still another aspect of the present invention provides a gateway auto-configuration server ACS, including: a receiving unit, configured to receive service server information sent by a service server, where the service server is corresponding to one application service; a generating unit, configured to generate a service template according to the service server information from the receiving unit, where the service template includes a first application identifier; and a sending unit, configured to send the service template from the generating unit to a home gateway, so that the home gateway creates, according to the service template, a virtual client for the application service corresponding to the first application identifier and when an application service corresponding to a second application identifier acquired from a terminal belongs to the application service corresponding to the first application identifier, maps information corresponding to the second application identifier, to the virtual client corresponding to the first application identifier, where the virtual client implements message exchange between the service server corresponding to the first application identifier and the terminal.

Still another aspect of the present invention provides a home network, including: at least one service server, where the service server is corresponding to one application service, and is configured to send service server information to a gateway ACS, and implement message exchange with a terminal by using a corresponding virtual client on a home gateway; the gateway ACS, configured to generate a service template according to the service server information received from the service server, where the service template includes a first application identifier; the terminal, configured to provide a second application identifier of the terminal for the home gateway, and configured to implement, through the virtual client on the home gateway, message exchange with the service server corresponding to the virtual client; and the home gateway, configured to acquire the service template from the gateway ACS, create, according to the service template, the virtual client for the application service corresponding to the first application identifier, and when an application service corresponding to the second application identifier from the terminal belongs to the application service corresponding to the first application identifier, map information corresponding to the second application identifier, to the virtual client corresponding to the first application identifier, where the virtual client implements message exchange between the service server corresponding to the first application identifier and the terminal.

With reference to the foregoing aspect and any one possible implementation manner, an implementation manner is further provided, where the service template further includes: a uniform resource locator URL of the service server corresponding to the first application identifier, and a user name and password of a corresponding connection request.

With reference to the foregoing aspect and any one possible implementation manner, an implementation manner is further provided, where the terminal includes a ZigBee® device; the description information of the terminal includes: a node description file and at least one brief description file, where the brief description file includes the second application identifier; and the home gateway is specifically configured to acquire the description information of the terminal from the terminal by using a command of a service discovery function.

With reference to the foregoing aspect and any one possible implementation manner, an implementation manner is further provided, where the at least one service server is specifically configured to deliver a command request message to the corresponding virtual client on the home gateway; the home gateway is specifically configured to cause the virtual client to send a message indicating that the virtual client is online, to the corresponding service server, cause the virtual client to receive the command request message delivered by the corresponding service server and after performing protocol conversion on the command request message, send the command request message to the terminal, and cause the virtual client to receive a command response message returned by the terminal and after performing protocol conversion on the command response message, send the command response message to the corresponding service server; and the terminal is specifically configured to execute a command in the command request message from the home gateway, and return the command response message to the corresponding virtual client on the home gateway.

With reference to the foregoing aspect and any one possible implementation manner, an implementation manner is further provided, where the home network further includes a ZigBee® gateway; the terminal includes a ZigBee® device; the description information of the terminal includes: a node description file and at least one brief description file, where the brief description file includes the second application identifier; and the home gateway is specifically configured to acquire the description information of the terminal from the ZigBee® gateway, where the description information of the terminal is uploaded to the ZigBee® gateway by using a ZigBee® device profile ZDP command when the terminal joins a ZigBee® network; or the home gateway is specifically configured to invoke a device discovery report function of the ZigBee® gateway, so that the ZigBee® gateway is specifically configured to acquire and return the description information of the terminal.

With reference to the foregoing aspect and any one possible implementation manner, an implementation manner is further provided, where the at least one service server is specifically configured to deliver a command request message to the corresponding virtual client on the home gateway; the home gateway is specifically configured to cause the virtual client to send a message indicating that the virtual client is online, to the corresponding service server, cause the virtual client to receive the command request message delivered by the corresponding service server and forward the command request message to the ZigBee® gateway, and cause the virtual client to receive a command response message returned by the ZigBee® gateway and forward the command response message to the corresponding service server; the ZigBee® gateway is specifically configured to send, after performing protocol conversion on the command request message, the command request message to the terminal, and send, after performing protocol conversion on the command response message, the command response message to the corresponding virtual client on the home gateway; and the terminal is specifically configured to execute a command in the command request message, and return the command response message to the ZigBee® gateway.

As may be seen from the summary of the invention, a gateway ACS generates a service template, where the service template includes a first application identifier corresponding to a service server; and a home gateway creates a corresponding virtual client for the service server according to the first application identifier in the service template, matches a terminal with the virtual client according to a second application identifier in description information of the terminal and the first application identifier, maps the description information of the terminal to the matched virtual client, and uses the virtual client to implement information exchange between the corresponding service server and the terminal, thereby implementing management of the terminal by the service server by using the virtual client set on the home gateway.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

In the following embodiments of the present invention, a home network includes: at least one service server, at least one terminal, one home gateway, and one gateway ACS managing the home gateway. For example, the terminal may be a home electrical appliance such as an air conditioner, the service server may be a home autonomous server, and the gateway ACS is configured to configure the home gateway, where the home autonomous server controls, by using the home gateway, running of the air conditioner.

Figure 1:
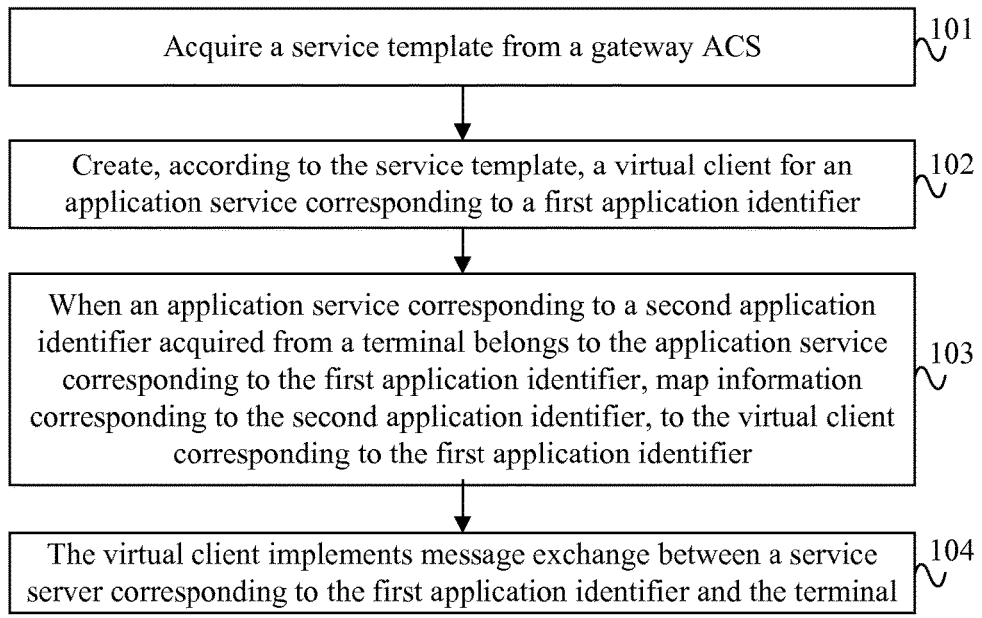
FIG. 1 is a flowchart of a method for terminal management in a home network according to Embodiment 1 of the present invention.

FIG. 1 is a flowchart of a method for terminal management in a home network according to Embodiment 1 of the present invention. As shown in FIG. 1, the method includes the following process.

Step 101: Acquire a service template from a gateway ACS.

In this step, a home gateway acquires a service template from a gateway ACS. Specifically, the service template is generated by the gateway ACS according to service server information received from at least one service server. The service server is corresponding to one application service, and the service template includes at least one first application identifier, where the first application identifier is corresponding to one application service.

Step 102: Create, according to the service template, a virtual client for an application service corresponding to a first application identifier.

Step 103: When an application service corresponding to a second application identifier acquired from a terminal belongs to the application service corresponding to the first application identifier, map information corresponding to the second application identifier, to the virtual client corresponding to the first application identifier.

Specifically, the second application identifier may be acquired in the following manner: acquiring description information from the terminal, where the description information includes at least one second application identifier.

Step 104: The virtual client implements message exchange between a service server corresponding to the first application identifier and the terminal.

In this step, message exchange between the service server corresponding to the client and the terminal is implemented by using the virtual client. Thereby, a control message of the service server is sent to the terminal, and management of the terminal by the service server is implemented.

In the foregoing technical solution, the second application identifier in step 103 is acquired from the terminal. The second application identifier may be acquired by acquiring the description information from the terminal. According to a different execution sequence of the foregoing steps, the foregoing solution specifically includes the following three implementation manners.

Manner 1:

Step 1: Execute the foregoing step 101, that is, acquire the service template from the gateway ACS, where the service template includes the first application identifier.

Step 2: Acquire the description information from the terminal, where the description information includes the second application identifier.

Step 3: Determine whether the application service corresponding to the second application identifier is the application service corresponding to the first application identifier. After step 3, step 4 is executed. In addition, when a determining result in step 3 is that the application service corresponding to the second application identifier belongs to the application service corresponding to the first application identifier, step 5 is executed after step 4 is executed.

Step 4: Execute the foregoing step 102, that is, create, according to the service template, the virtual client for the application service corresponding to the first application identifier.

Step 5: Execute the foregoing step 103, that is, when the application service corresponding to the second application identifier acquired from the terminal belongs to the application service corresponding to the first application identifier, map the information corresponding to the second application identifier, to the virtual client corresponding to the first application identifier.

Step 6: Execute the foregoing step 104, that is, the virtual client implements message exchange between the service server corresponding to the first application identifier and the terminal.

Manner 2:

Step 1: Execute the foregoing step 101, that is, acquire the service template from the gateway ACS, where the service template includes the first application identifier.

Step 2: Execute the foregoing step 102, that is, create, according to the service template, the virtual client for the application service corresponding to the first application identifier.

Step 3: Acquire the description information from the terminal, where the description information includes the second application identifier.

Step 4: Determine whether the application service corresponding to the second application identifier is the application service corresponding to the first application identifier. When a determining result in step 4 is that the application service corresponding to the second application identifier belongs to the application service corresponding to the first application identifier, step 5 is executed.

Step 5: Execute the foregoing step 103, that is, when the application service corresponding to the second application identifier acquired from the terminal belongs to the application service corresponding to the first application identifier, map the information corresponding to the second application identifier, to the virtual client corresponding to the first application identifier.

Step 6: Execute the foregoing step 104, that is, the virtual client implements message exchange between the service server corresponding to the first application identifier and the terminal.

Manner 3:

Step 1: Execute the foregoing step 101, that is, acquire the service template from the gateway ACS, where the service template includes the first application identifier.

Step 2: Acquire the description information from the terminal, where the description information includes the second application identifier.

Step 3: Execute the foregoing step 102, that is, create, according to the service template, the virtual client for the application service corresponding to the first application identifier.

Step 4: Determine whether the application service corresponding to the second application identifier is the application service corresponding to the first application identifier. When a determining result in step 4 is that the application service corresponding to the second application identifier belongs to the application service corresponding to the first application identifier, step 5 is executed.

Step 5: Execute the foregoing step 103, that is, when the application service corresponding to the second application identifier acquired from the terminal belongs to the application service corresponding to the first application identifier, map the information corresponding to the second application identifier, to the virtual client corresponding to the first application identifier.

Step 6: Execute the foregoing step 104, that is, the virtual client implements message exchange between the service server corresponding to the first application identifier and the terminal.

In Embodiment 1 of the present invention, a corresponding virtual client is created for a service server according to a first application identifier in a service template generated by a gateway ACS, where the service template includes the first application identifier corresponding to the service server; a terminal is matched with the virtual client according to a second application identifier from the terminal and the first application identifier; description information of the terminal is mapped to the matched virtual client, and the virtual client is used to implement information exchange between the corresponding service server and the terminal, thereby implementing management of the terminal by multiple service servers by using the virtual client set on a home gateway.

Figure 2:
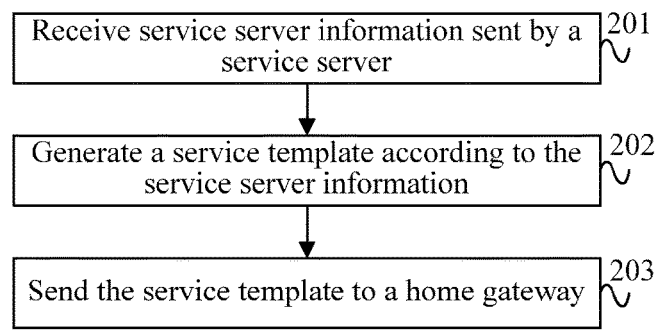
FIG. 2 is a flowchart of a method for terminal management in a home network according to Embodiment 2 of the present invention.

FIG. 2 is a flowchart of a method for terminal management in a home network according to Embodiment 2 of the present invention. As shown in FIG. 2, the method includes the following process.

Step 201: Receive service server information sent by a service server.

In this step, service server information sent by at least one service server is received. Specifically, the service server is corresponding to one application service.

Step 202: Generate a service template according to the service server information.

In this step, the service template is generated according to the service server information received from at least one service server, where the service template includes at least one first application identifier, where the first application identifier is corresponding to one application service.

Step 203: Send the service template to a home gateway.

In this step, the service template is sent to the home gateway, so that the home gateway creates, according to the service template, a virtual client for the application service corresponding to the first application identifier and when an application service corresponding to a second application identifier acquired from a terminal belongs to the application service corresponding to the first application identifier, maps information corresponding to the second application identifier, to the virtual client corresponding to the first application identifier, where the virtual client on the home gateway implements message exchange between the service server corresponding to the first application identifier and the terminal. Thereby, message exchange between the service server corresponding to the client and the terminal is implemented by using the virtual client on the home gateway, a control message of the service server is sent to the terminal, and management of the terminal by the service server is implemented.

In Embodiment 2 of the present invention, a service template is generated and sent to a home gateway, where the service template includes a first application identifier corresponding to a service server, so that the home gateway creates a corresponding virtual client for the service server according to the first application identifier in the service template, matches a terminal with the virtual client according to a second application identifier from the terminal and the first application identifier, maps description information of the terminal to the matched virtual client, and uses the virtual client to implement information exchange between the corresponding service server and the terminal, thereby implementing management of the terminal by multiple service servers by using the virtual client set on the home gateway.

Figure 3A:
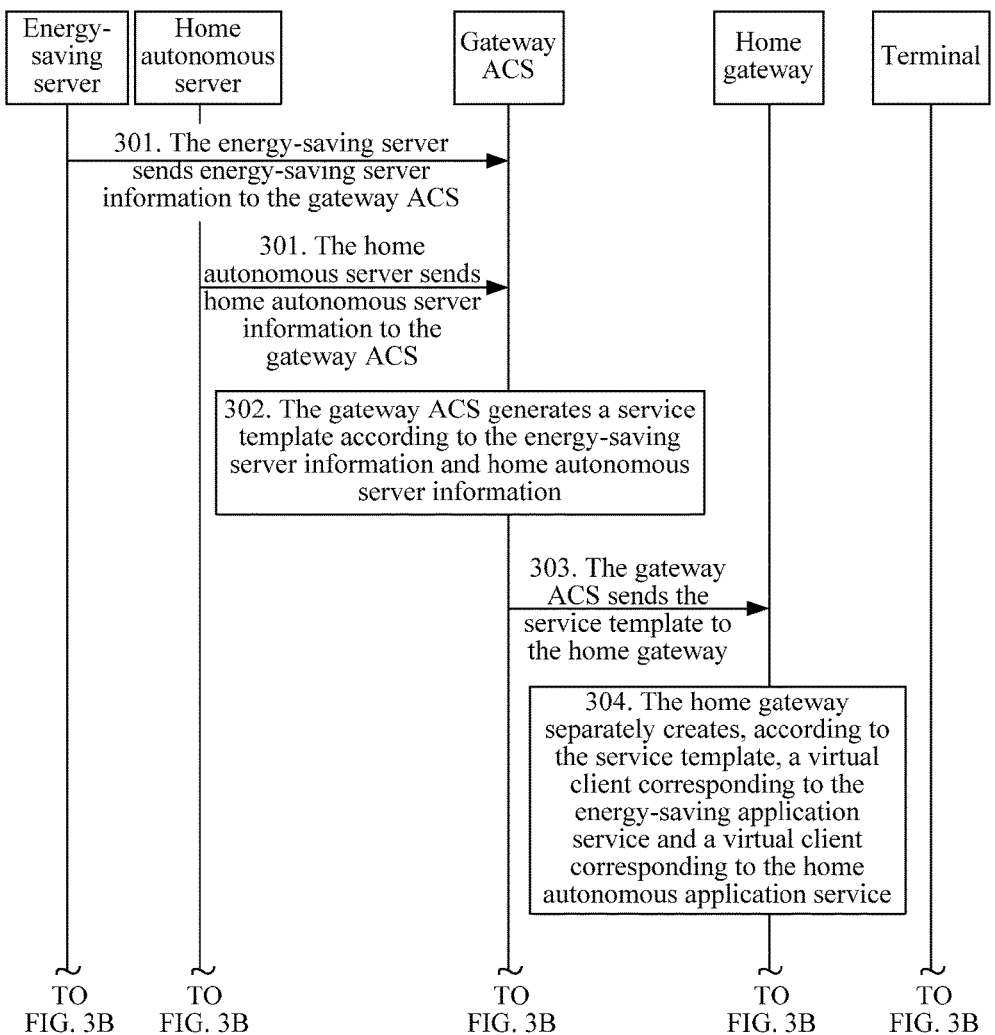
FIG. 3A, FIG. 3B, and FIG. 3C are a signaling flowchart of a method for terminal management in a home network according to Embodiment 3 of the present invention.
Figure 3B:
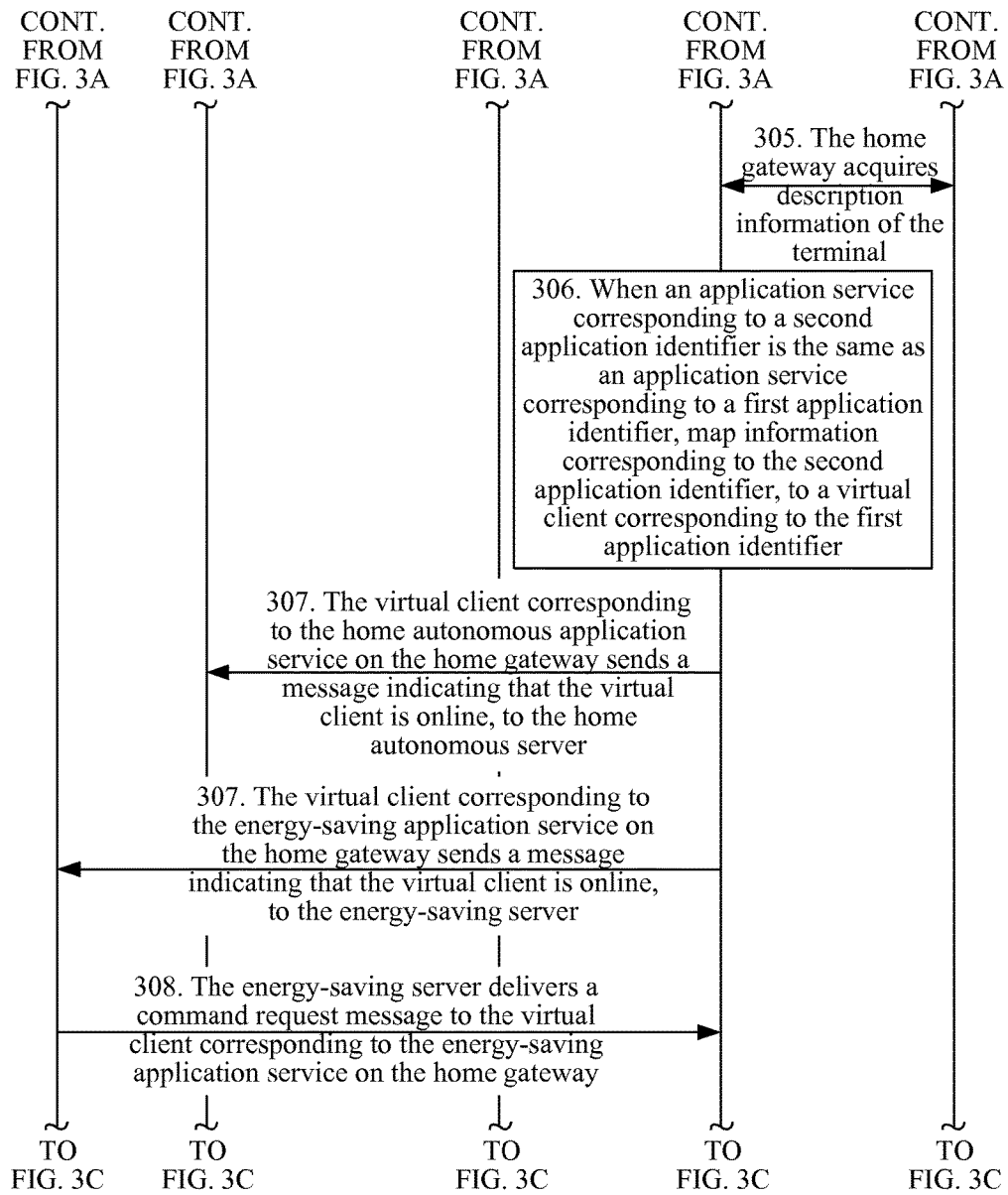
Figure 3C:
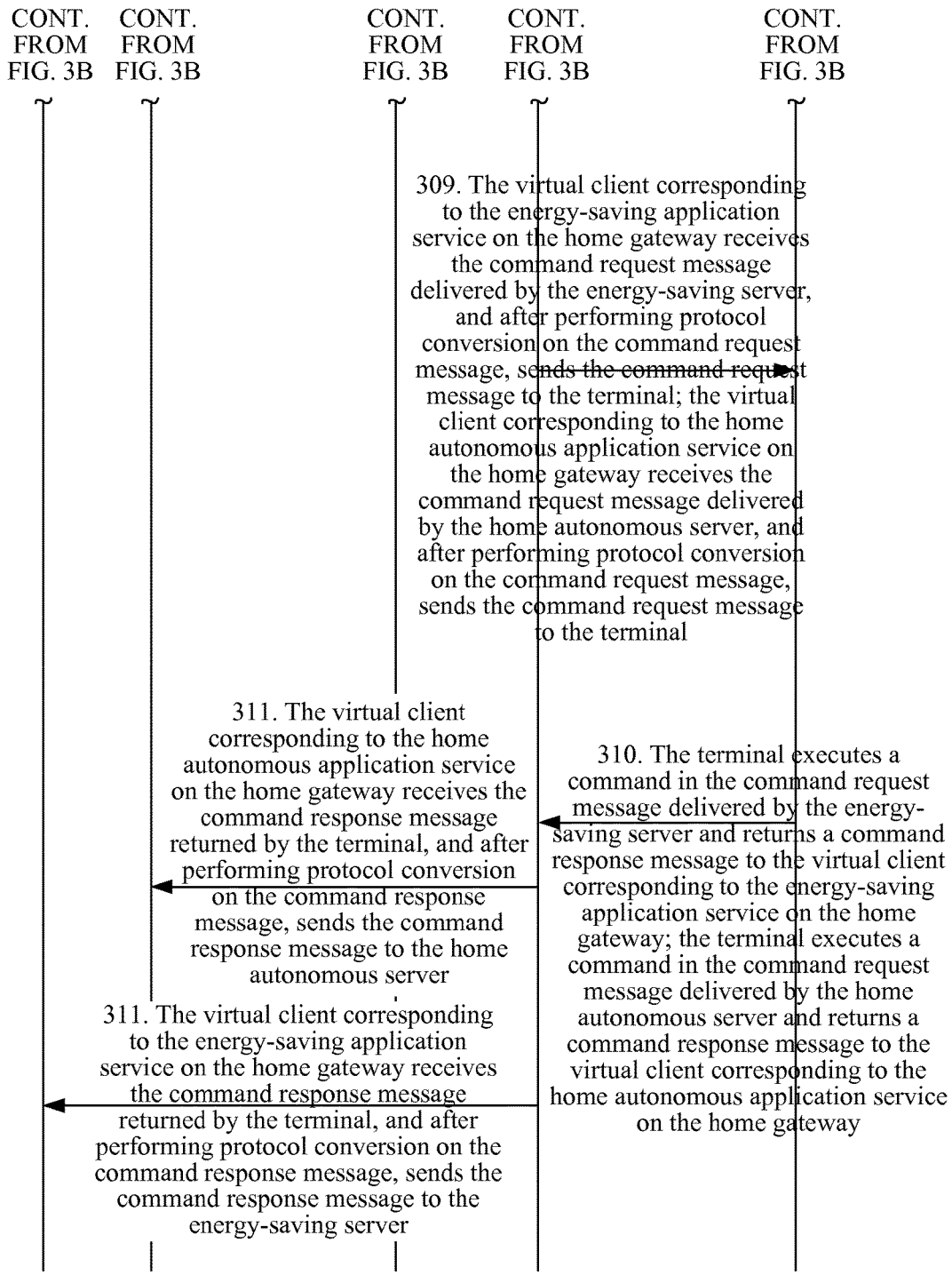

FIG. 3A, FIG. 3B, and FIG. 3C are a signaling flowchart of a method for terminal management in a home network according to Embodiment 3 of the present invention. In Embodiment 3 of the present invention, for example, a home network includes two service servers, which are an energy-saving server and a home autonomous server respectively, and a terminal needs to be managed by the two service servers. Specifically, the energy-saving server is corresponding to an energy-saving application service, and the home autonomous server is corresponding to a home autonomous application service. As shown in FIG. 3A, FIG. 3B, and FIG. 3C, the method includes the following process.

Step 301: An energy-saving server sends energy-saving server information to a gateway ACS, and a home autonomous server sends home autonomous server information to the gateway ACS.

In this step, at least one service server in the home network sends service server information to the gateway ACS. Specifically, in Embodiment 3 of the present invention, the home network includes the two service servers: the energy-saving server and the home autonomous server. The service server information sent by the energy-saving server is specifically the energy-saving server information, and the service server information sent by the home autonomous server is specifically the home autonomous server information.

Step 302: The gateway ACS generates a service template according to the energy-saving server information and home autonomous server information.

In this step, the gateway ACS receives the service server information sent by the at least one service server, and generates the service template according to the service server information. The service template includes at least one first application identifier, where the first application identifier is corresponding to one application service. Because the service server is corresponding to one application service, the first application identifier is also corresponding to one service server. Further, the service template may further include: a Uniform/Universal Resource Locator (URL) of the service server corresponding to the first application identifier, and a user name and password of a connection request corresponding to the first application identifier. Specifically, in Embodiment 3 of the present invention, the gateway ACS receives the energy-saving server information sent by the energy-saving server and the home autonomous server information sent by the home autonomous server, and generates the service template according to the energy-saving server information and home autonomous server information. The service template includes two first application identifiers, where one first application identifier is corresponding to the energy-saving server, and the other first application identifier is corresponding to the home autonomous server.

Step 303: The gateway ACS sends the service template to a home gateway.

Step 304: The home gateway separately creates, according to the service template, a virtual client corresponding to the energy-saving application service and a virtual client corresponding to the home autonomous application service.

In this step, the home gateway creates, according to the service template, a corresponding virtual client for the service server corresponding to the first application identifier in the service template. Specifically, in Embodiment 3 of the present invention, the home gateway creates, according to the service template, a corresponding virtual client for the first application identifier corresponding to the energy-saving server in the service template, where the virtual client is a client corresponding to the energy-saving server; the home gateway creates, according to the service template, a corresponding virtual client for the first application identifier corresponding to the home autonomous server in the service template, where the virtual client is a client corresponding to the home autonomous server. That is, the home gateway separately creates, according to the service template, the client corresponding to the energy-saving server and the client corresponding to the home autonomous server.

Step 305: The home gateway acquires description information of the terminal.

In this step, the home gateway acquires the description information of the terminal, where the description information of the terminal includes at least one second application identifier and information corresponding to the second application identifier. Specifically, the description information of the terminal may include a node description file and at least one brief description file, where the brief description file includes one second application identifier. Therefore, the description information of the terminal totally includes at least one second application identifier. In the embodiment of the present invention, the terminal may be specifically a ZigBee® device. Correspondingly, a specific method for acquiring the description information of the terminal by the home gateway may be: acquiring, by the home gateway, the description information of the terminal from the terminal by using a command of a service discovery function. For example, the home gateway acquires the description information of the ZigBee® device by using a series of commands of a device and service discovery function of a ZigBee® protocol.

Step 306: When an application service corresponding to a second application identifier belongs to an application service corresponding to a first application identifier, map information corresponding to the second application identifier, to a virtual client corresponding to the first application identifier.

In this step, specifically, the home gateway compares the second application identifier in the brief description file with the first application identifier in the service template according to the acquired description information of the terminal; when the application service corresponding to the second application identifier belongs to the application service corresponding to the first application identifier, the home gateway maps the description information of the terminal to which the second application identifier belongs, to the virtual client corresponding to the first application identifier. A specific mapping method may be as follows: The home gateway generates a data model of the terminal according to the description information of the terminal, and embeds the data model of the terminal into a data model of the virtual client corresponding to the first application identifier. In Embodiment 3 of the present invention, for example, the terminal needs to be managed by both the energy-saving server and the home autonomous server; therefore, the description information of the terminal includes two second application identifiers, where one second application identifier is corresponding to the energy-saving server, and the other second application identifier is corresponding to the home autonomous server. The home gateway compares the second application identifier with the first application identifier. The application service corresponding to the second application identifier belongs to the application service corresponding to the first application service, and therefore the home gateway maps the description information of the terminal corresponding to the second application identifier, to the virtual client corresponding to the energy-saving application service. The application service corresponding to the second application identifier corresponding to the home autonomous application service belongs to the application service corresponding to the first application identifier corresponding to the home autonomous application service, and therefore the home gateway maps the description information of the terminal corresponding to the second application identifier, to the virtual client corresponding to the home autonomous application service.

After step 306, message exchange between the service server corresponding to the first application identifier and the terminal is implemented by using the virtual client on the home gateway. Thereby, a control message of the service server is sent to the terminal, and management of the terminal by the service server is implemented. Specifically, the process may include the following steps 307 to step 311.

Step 307: The virtual client corresponding to the energy-saving application service on the home gateway sends a message indicating that the virtual client is online, to the energy-saving server, and the virtual client corresponding to the home autonomous application service on the home gateway sends a message indicating that the virtual client is online, to the home autonomous server.

In this step, the virtual client on the home gateway sends the message indicating that the virtual client is online, to the corresponding service server. Specifically, the virtual client corresponding to the energy-saving application service on the home gateway establishes a session with the energy-saving server, and sends the indication that the virtual client is online, to the energy-saving server by using an Inform message, where the Inform message includes a data model of the virtual client corresponding to the energy-saving application service, and optionally, the Inform message may further include the data model of the terminal, and the home gateway informs the energy-saving server about generation of the virtual client by using the Inform message; the virtual client corresponding to the home autonomous application service on the home gateway establishes a session with the home autonomous server, and sends the indication that the virtual client is online, to the home autonomous server by using an Inform message, where the Inform message includes a data model of the virtual client corresponding to the home autonomous application service, and optionally, the Inform message may further include the data model of the terminal, and the home gateway informs the home autonomous server about generation of the virtual client by using the Inform message.

Step 308: The energy-saving server delivers a command request message to the virtual client corresponding to the energy-saving application service on the home gateway, and the home autonomous server delivers a command request message to the virtual client corresponding to the home autonomous application service on the home gateway.

In this step, each service server delivers the command request message to the corresponding virtual client on the home gateway. Specifically, in Embodiment 3 of the present invention, the energy-saving server invokes, by using a Set Parameter method, a command on the data model of the terminal in the virtual client corresponding to the energy-saving application service on the home gateway, so as to deliver the command request message to the virtual client corresponding to the energy-saving application service; the home autonomous server invokes, by using a Set Parameter method, a command on the data model of the terminal in the virtual client corresponding to the home autonomous application service on the home gateway, so as to deliver the command request message to the virtual client corresponding to the home autonomous application service.

Step 309: The virtual client corresponding to the energy-saving application service on the home gateway receives the command request message delivered by the energy-saving server, and after performing protocol conversion on the command request message, sends the command request message to the terminal; the virtual client corresponding to the home autonomous application service on the home gateway receives the command request message delivered by the home autonomous server, and after performing protocol conversion on the command request message, sends the command request message to the terminal.

In this step, the virtual client on the home gateway receives the command request message delivered by the corresponding service server, and after performing protocol conversion on the command request message, sends the command request message to the terminal. Specifically, in Embodiment 3 of the present invention, the virtual client corresponding to the energy-saving application service on the home gateway receives the command request message delivered by the energy-saving server, and after performing protocol conversion on the command request message delivered by the energy-saving server, sends the command request message to the terminal; the virtual client corresponding to the home autonomous application service on the home gateway receives the command request message delivered by the home autonomous server, and after performing protocol conversion on the command request message delivered by the home autonomous server, sends the command request message to the terminal.

Step 310: The terminal executes a command in the command request message delivered by the energy-saving server and returns a command response message to the virtual client corresponding to the energy-saving application service on the home gateway; the terminal executes a command in the command request message delivered by the home autonomous server and returns a command response message to the virtual client corresponding to the home autonomous application service on the home gateway.

In this step, the terminal executes the command in the command request message and returns the command response message to the corresponding virtual client on the home gateway. Specifically, after performing protocol conversion on the command request message delivered by the energy-saving server, the virtual client corresponding to the energy-saving application service on the home gateway sends the command request message to the terminal, so that the terminal executes the command in the command request message. Because the command request message comes from the virtual client corresponding to the energy-saving application service on the home gateway, and is corresponding to the energy-saving server, the terminal returns a command response message to the virtual client corresponding to the energy-saving application service on the home gateway. After performing protocol conversion on the command request message delivered by the home autonomous server, the virtual client corresponding to the home autonomous application service on the home gateway sends the command request message to the terminal, so that the terminal executes the command in the command request message. Because the command request message comes from the virtual client corresponding to the home autonomous application service on the home gateway, and is corresponding to the home autonomous server, the terminal returns a command response message to the virtual client corresponding to the home autonomous application service on the home gateway.

Step 311: The virtual client corresponding to the energy-saving application service on the home gateway receives the command response message returned by the terminal, and after performing protocol conversion on the command response message, sends the command response message to the energy-saving server; the virtual client corresponding to the home autonomous application service on the home gateway receives the command response message returned by the terminal, and after performing protocol conversion on the command response message, sends the command response message to the home autonomous server.

\In this step, the virtual client on the home gateway receives the command response message returned by the terminal, and after performing protocol conversion on the command response message, sends the command response message to the corresponding service server. Specifically, the virtual client corresponding to the energy-saving application service on the home gateway receives the command response message returned by the terminal, and after performing protocol conversion on the command response message, sends the command response message to the energy-saving server; the virtual client corresponding to the home autonomous application service on the home gateway receives the command response message returned by the terminal, and after performing protocol conversion on the command response message, sends the command response message to the home autonomous server.

In Embodiment 3 of the present invention, a gateway ACS generates a service template, where the service template includes multiple first application identifiers respectively corresponding to multiple service servers; and a home gateway creates corresponding virtual clients for the service servers according to the first application identifiers in the service template, matches a terminal with the virtual clients according to second application identifiers in description information of the terminal and the first application identifiers, maps the description information of the terminal to the matched virtual clients, and uses the virtual clients to implement information exchange between the corresponding service servers and the terminal, thereby implementing management of the terminal by the multiple service servers by using the multiple virtual clients set on the home gateway.

Figure 4A:
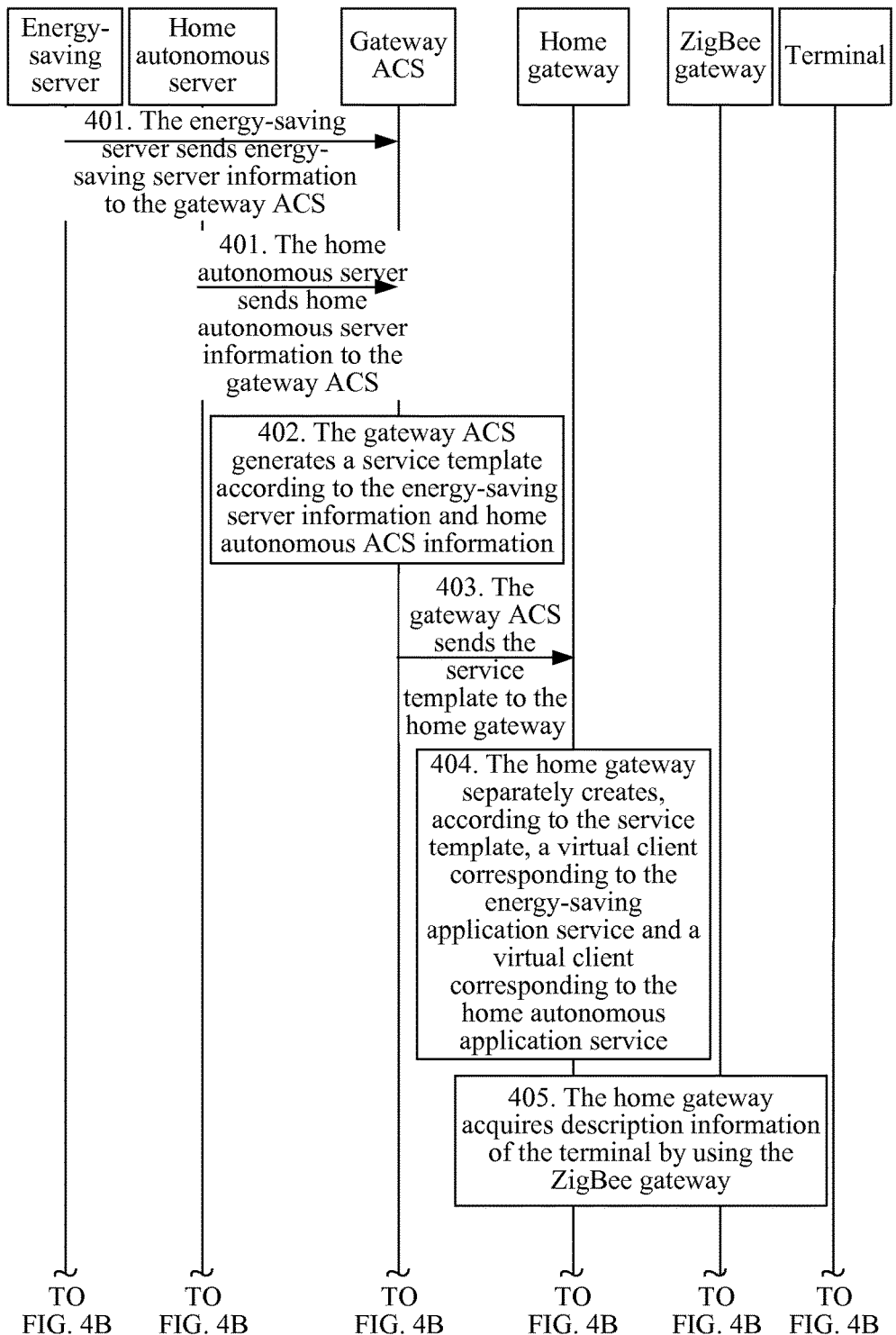
FIG. 4A, FIG. 4B, and FIG. 4C are a signaling flowchart of a method for terminal management in a home network according to Embodiment 4 of the present invention.
Figure 4B:
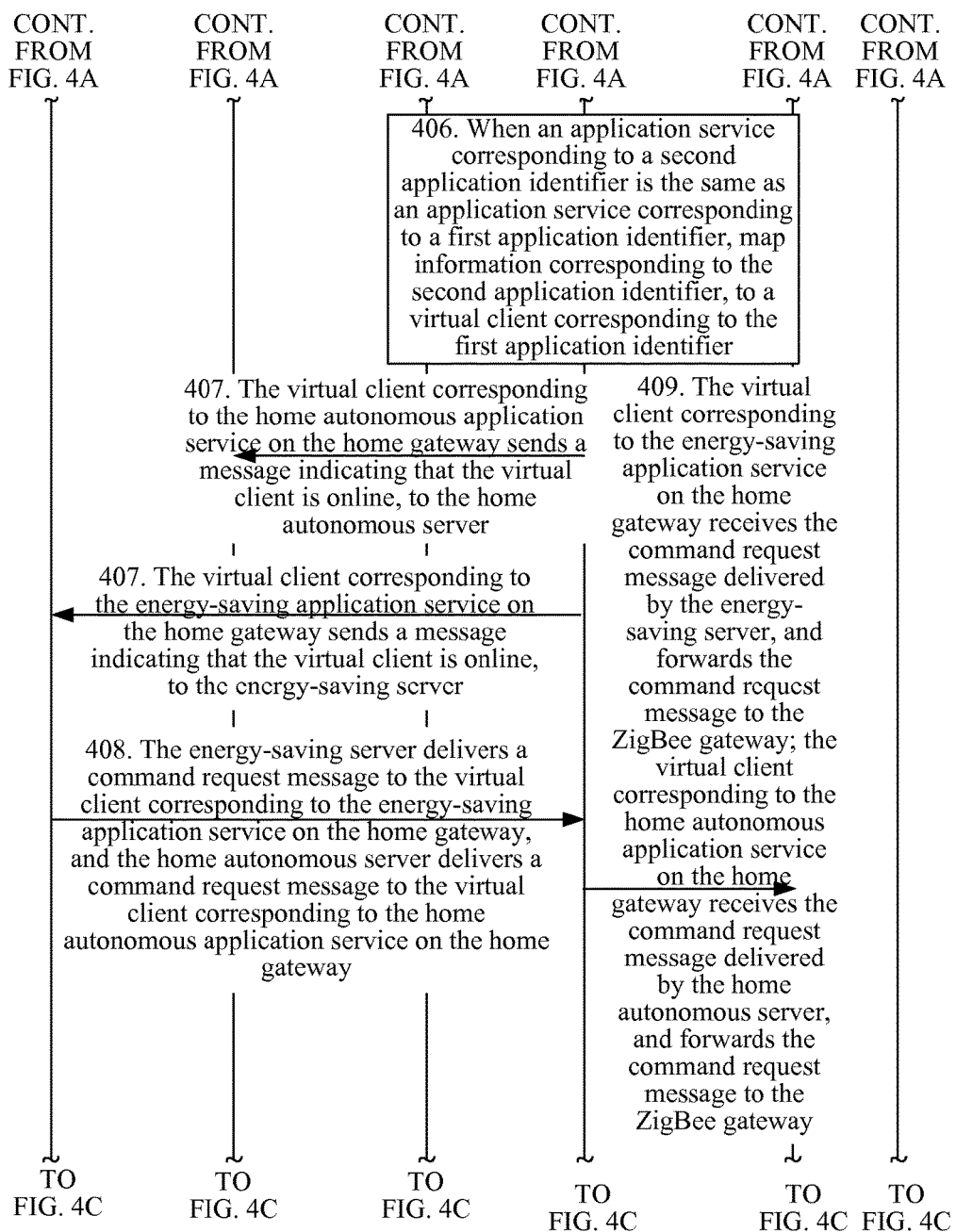
Figure 4C:
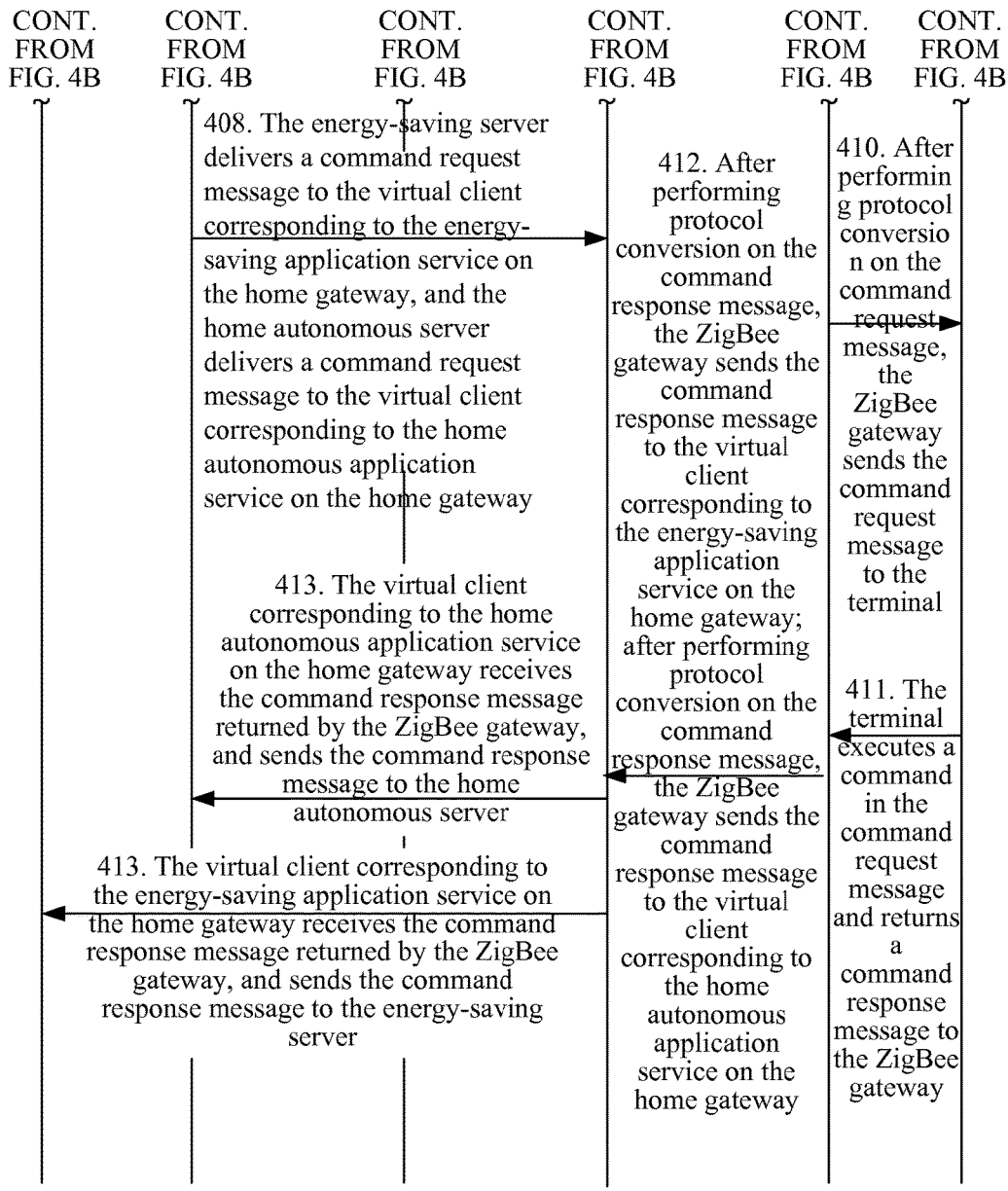

FIG. 4A, FIG. 4B, and FIG. 4C are a signaling flowchart of a method for terminal management in a home network according to Embodiment 4 of the present invention. In Embodiment 4 of the present invention, for example, a home network includes two service servers, which are an energy-saving server and a home autonomous server respectively, and a terminal needs to be managed by the two service servers. In addition, in Embodiment 4 of the present invention, for example, the terminal is a ZigBee® device, and the home network includes a ZigBee® gateway, where the ZigBee® gateway implements information exchange between a home gateway and the ZigBee® device. In an actual application, the managed terminal may be not only a ZigBee® device, but also other types of devices, for example, a Bluetooth device and a Z-Wave device. Z-Wave is a wireless networking specification dominated by a Danish company Zensys. In a case in which the terminal is a ZigBee® device, a ZigBee® gateway is used as a bridging gateway; in a case in which the terminal is a Bluetooth device, a Bluetooth gateway is used as a bridging gateway to implement a function of the ZigBee® gateway in Embodiment 4 of the present invention; in a case in which the terminal is a Z-Wave device, a Z-Wave gateway is used as a bridging gateway to implement a function of the ZigBee® gateway in Embodiment 4 of the present invention. Specifically, the energy-saving server is corresponding to an energy-saving application service, and the home autonomous server is corresponding to a home autonomous application service. As shown in FIG. 4A, FIG. 4B, and FIG. 4C, the method includes the following process.

Step 401: An energy-saving server sends energy-saving server information to a gateway ACS, and a home autonomous server sends home autonomous server information to the gateway ACS.

In this step, at least one service server in the home network sends service server information to the gateway ACS. Specifically, in Embodiment 4 of the present invention, the home network includes the two service servers: the energy-saving server and the home autonomous server. The service server information sent by the energy-saving server is specifically the energy-saving server information, and the service server information sent by the home autonomous server is specifically the home autonomous server information.

Step 402: The gateway ACS generates a service template according to the energy-saving server information and home autonomous server information.

In this step, the gateway ACS receives the service server information sent by the at least one service server, and generates the service template according to the service server information. The service template includes at least one first application identifier, where the first application identifier is corresponding to a service server. Further, the service template may further include: a URL of the service server corresponding to the first application identifier, and a user name and password of a connection request corresponding to the first application identifier. Specifically, in Embodiment 4 of the present invention, the gateway ACS receives the energy-saving server information sent by the energy-saving server and the home autonomous server information sent by the home autonomous server, and generates the service template according to the energy-saving server information and home autonomous server information. The service template includes two first application identifiers, where one first application identifier is corresponding to the energy-saving server, and the other first application identifier is corresponding to the home autonomous server.

Step 403: The gateway ACS sends the service template to a home gateway.

Step 404: The home gateway separately creates, according to the service template, a virtual client corresponding to the energy-saving application service and a virtual client corresponding to the home autonomous application service.

In this step, the home gateway creates, according to the service template, a corresponding virtual client for the service server corresponding to the first application identifier in the service template. Specifically, in Embodiment 4 of the present invention, the home gateway creates, according to the service template, a corresponding virtual client for the first application identifier corresponding to the energy-saving server in the service template, where the virtual client is a client corresponding to the energy-saving server; the home gateway creates, according to the service template, a corresponding virtual client for the first application identifier corresponding to the home autonomous server in the service template, where the virtual client is a client corresponding to the home autonomous server. That is, the home gateway separately creates, according to the service template, the client corresponding to the energy-saving server and the client corresponding to the home autonomous server.

Step 405: The home gateway acquires description information of the terminal by using the ZigBee® gateway.

In this step, the home gateway acquires the description information of the terminal. The description information of the terminal includes at least one second application identifier and information corresponding to the second application identifier. Specifically, the description information of the terminal may include a node description file and at least one brief description file, where the brief description file includes one second application identifier. Therefore, the description information of the terminal totally includes at least one second application identifier.

In Embodiment 4 of the present invention, specifically, the terminal is a ZigBee® device, and the home gateway acquires the description information of the terminal by using the ZigBee® gateway. A specific method of this step may adopt the following two methods.

Method 1: The home gateway acquires the description information of the terminal from the ZigBee® gateway, where the description information of the terminal is uploaded to the ZigBee® gateway by using a ZigBee® Device Profile (ZDP) command when the terminal joins a ZigBee® network. Specifically, by using method 1, when the ZigBee® device joins the ZigBee® network, the ZigBee® device uploads the description information of the ZigBee® device to the ZigBee® gateway by using a series of ZDP commands; then, when step 405 is executed, the home gateway acquires the description information of the ZigBee® device on the ZigBee® gateway by using a series of ZDP commands.

Method 2: The home gateway invokes a device discovery report function of the ZigBee® gateway, so that the ZigBee® gateway acquires the description information of the terminal and returns the description information of the terminal to the home gateway.

Step 406: When an application service corresponding to a second application identifier belongs to an application service corresponding to a first application identifier, map information corresponding to the second application identifier, to a virtual client corresponding to the first application identifier.

In this step, specifically, the home gateway compares the second application identifier in the brief description file with the first application identifier in the service template according to the acquired description information of the terminal; when the application service corresponding to the second application identifier belongs to the application service corresponding to the first application identifier, the home gateway maps the description information of the terminal corresponding to the second application identifier, to the virtual client corresponding to the first application identifier. A specific mapping method may be as follows: The home gateway generates a data model of the terminal according to the description information of the terminal, and embeds the data model of the terminal into a data model of the virtual client corresponding to the first application identifier. In Embodiment 4 of the present invention, for example, the terminal needs to be managed by both the energy-saving server and the home autonomous server; therefore, the description information of the terminal includes two second application identifiers, where one second application identifier is corresponding to the energy-saving application service, and the other second application identifier is corresponding to the home autonomous application service. The home gateway compares the second application identifier with the first application identifier. The application service corresponding to the second application identifier corresponding to the energy-saving application service belongs to the application service corresponding to the first application identifier corresponding to the energy-saving application service, and therefore the home gateway maps the description information of the terminal corresponding to the second application identifier, to the virtual client corresponding to the energy-saving application service. The application service corresponding to the second application identifier corresponding to the home autonomous application service belongs to the application service corresponding to the first application identifier corresponding to the home autonomous application service, and therefore the home gateway maps the description information of the terminal corresponding to the second application identifier, to the virtual client corresponding to the home autonomous application service.

After step 406, message exchange between the service server corresponding to the first application identifier and the terminal is implemented by using the virtual client on the home gateway. Thereby, a control message of the service server is sent to the terminal, and management of the terminal by the service server is implemented. Specifically, the process may include the following steps 407 to step 413.

Step 407: The virtual client corresponding to the energy-saving application service on the home gateway sends a message indicating that the virtual client is online, to the energy-saving server, and the virtual client corresponding to the home autonomous application service on the home gateway sends a message indicating that the virtual client is online, to the home autonomous server.

In this step, the virtual client on the home gateway sends the message indicating that the virtual client is online, to the corresponding service server. Specifically, the virtual client corresponding to the energy-saving application service on the home gateway establishes a session with the energy-saving server, where the Inform message includes a data model of the virtual client corresponding to the energy-saving application service, and optionally, the Inform message may further include the data model of the terminal, and the home gateway informs the energy-saving server about generation of the virtual client by using the Inform message; the virtual client corresponding to the home autonomous application service on the home gateway establishes a session with the home autonomous server, and sends the message indicating that the virtual client is online, to the home autonomous server by using an Inform message, where the Inform message includes a data model of the virtual client corresponding to the home autonomous application service, and optionally, the Inform message may further include the data model of the terminal, and the home gateway informs the home autonomous server about generation of the virtual client by using the Inform message.

Step 408: The energy-saving server delivers a command request message to the virtual client corresponding to the energy-saving application service on the home gateway, and the home autonomous server delivers a command request message to the virtual client corresponding to the home autonomous application service on the home gateway.

In this step, the service server delivers the command request message to the corresponding virtual client on the home gateway. Specifically, in Embodiment 4 of the present invention, the energy-saving server invokes, by using a Set Parameter method, a command on the data model of the terminal in the virtual client corresponding to the energy-saving application service on the home gateway, so as to deliver the command request message to the virtual client corresponding to the energy-saving application service; the home autonomous server invokes, by using a Set Parameter method, a command on the data model of the terminal in the virtual client corresponding to the home autonomous application service on the home gateway, so as to deliver the command request message to the virtual client corresponding to the home autonomous application service.

Step 409: The virtual client corresponding to the energy-saving application service on the home gateway receives the command request message delivered by the energy-saving server, and forwards the command request message to a ZigBee® gateway; the virtual client corresponding to the home autonomous application service on the home gateway receives the command request message delivered by the home autonomous server, and forwards the command request message to the ZigBee® gateway.

In this step, the virtual client on the home gateway receives the command request message delivered by the corresponding service server, and forwards the command request message to the ZigBee® gateway. Specifically, the virtual client corresponding to the energy-saving application service on the home gateway receives the command request message delivered by the energy-saving server, and forwards the command request message to the ZigBee® gateway according to a ZigBee® gateway specification by invoking a corresponding Internet Protocol (IP) interface of the ZigBee® gateway. The virtual client corresponding to the home autonomous application service on the home gateway receives the command request message delivered by the home autonomous server, and forwards the command request message to the ZigBee® gateway according to the ZigBee® gateway specification by invoking the corresponding IP interface of the ZigBee® gateway.

Step 410: After performing protocol conversion on the command request message, the ZigBee® gateway sends the command request message to the terminal.

In this step, the ZigBee® gateway receives the command request messages from the virtual client corresponding to the energy-saving application service and virtual client corresponding to the home autonomous application service on the home gateway, and after performing protocol conversion on the command request messages, sends the command request messages to the terminal.

Step 411: The terminal executes a command in the command request message and returns a command response message to the ZigBee® gateway.

In this step, specifically, the terminal executes the command in the command request message on which protocol conversion is performed by the ZigBee® gateway, where the command request message comes from the energy-saving server and home autonomous server, and after executing the command, returns the command response message to the ZigBee® gateway.

Step 412: After performing protocol conversion on the command response message, the ZigBee® gateway sends the command response message to the virtual client corresponding to the energy-saving application service on the home gateway; after performing protocol conversion on the command response message, the ZigBee® gateway sends the command response message to the virtual client corresponding to the home autonomous application service on the home gateway.

In this step, the ZigBee® gateway receives the command response message returned by the terminal, and after performing protocol conversion on the command response message, returns the command response message to the corresponding virtual client on the home gateway. Specifically, after the terminal executes the command in the command request message delivered by the energy-saving ACS, where protocol conversion is performed on the command request message by the ZigBee® gateway, the terminal returns the command response message corresponding to the energy-saving server, to the ZigBee® gateway; and after performing protocol conversion on the command response message, the ZigBee® gateway returns the command response message to the virtual client corresponding to the energy-saving application service. After the terminal executes the command in the command request message delivered by the home autonomous ACS, where protocol conversion is performed on the command request message by the ZigBee® gateway, the terminal returns the command response message corresponding to the home autonomous server, to the ZigBee® gateway; and after performing protocol conversion on the command response message, the ZigBee® gateway returns the command response message to the virtual client corresponding to the home autonomous application service.

Step 413: The virtual client corresponding to the energy-saving application service on the home gateway receives the command response message returned by the ZigBee® gateway, and sends the command response message to the energy-saving server; the virtual client corresponding to the home autonomous application service on the home gateway receives the command response message returned by the ZigBee® gateway, and sends the command response message to the home autonomous server.

In this step, the virtual client on the home gateway receives the command response message returned by the ZigBee® gateway, and forwards the command response message to the corresponding service server. Specifically, the virtual client corresponding to the energy-saving application service on the home gateway receives the command response message returned by the ZigBee® gateway, and sends the command response message to the energy-saving server; the virtual client corresponding to the home autonomous application service on the home gateway receives the command response message returned by the ZigBee® gateway, and sends the command response message to the home autonomous server.

In Embodiment 4 of the present invention, a gateway ACS generates a service template, where the service template includes multiple first application identifiers respectively corresponding to multiple service servers; and a home gateway creates corresponding virtual clients for the service servers according to the first application identifiers in the service template, matches a terminal with the virtual clients according to second application identifiers in description information of the terminal and the first application identifiers, maps the description information of the terminal to the matched virtual clients, and uses the virtual clients to implement information exchange between the corresponding service servers and the terminal, thereby implementing management of the terminal by the multiple service servers by using the multiple virtual clients set on the home gateway. In addition, the home network includes a ZigBee® gateway; the home gateway implements information exchange with the terminal by using the ZigBee® gateway, acquires the description information of the terminal, and sends command messages of the multiple service servers to the terminal, thereby implementing management of the terminal by the multiple service servers.

Figure 5:
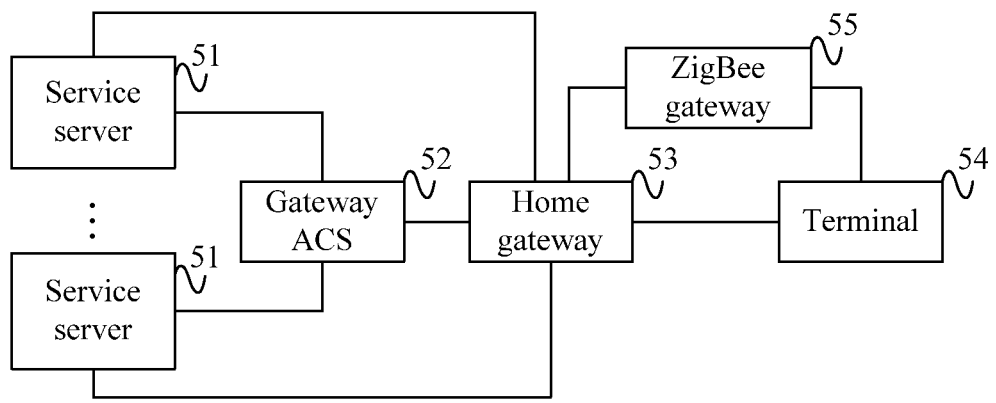
FIG. 5 is a schematic structural diagram of a home network according to Embodiment 5 of the present invention.

FIG. 5 is a schematic structural diagram of a home network according to Embodiment 5 of the present invention. As shown in FIG. 5, the home network includes: at least one service server 51, a gateway ACS 52, a home gateway 53, and a terminal 54, where a quantity of the service servers 51 is at least one. Further, when the terminal 54 is a ZigBee® device, the home network may further include a ZigBee® gateway 55.

The at least one service server 51 is configured to send service server information to the gateway ACS 52, and implement message exchange with the terminal 54 by using a corresponding virtual client on the home gateway 53.

The gateway ACS 52 is configured to generate a service template according to the service server information received from the at least one service server 51. The service template includes a first application identifier, where the first application identifier is corresponding to one application service.

The home gateway 53 is configured to acquire the service template from the gateway ACS 52, create, according to the service template, the corresponding virtual client for the application service corresponding to the first application identifier, and when an application service corresponding to a second application identifier from the terminal 54 belongs to the application service corresponding to the first application identifier, map information corresponding to the second application identifier, to the virtual client corresponding to the first application identifier, where the virtual client implements message exchange between the service server 51 corresponding to the first application identifier and the terminal 54.

The terminal 54 is configured to provide the second application identifier of the terminal 54 for the home gateway 53, where the second application identifier is corresponding to one application service, and configured to implement, through the virtual client on the home gateway 53, message exchange with the service server 51 corresponding to the virtual client.

On a basis of the foregoing technical solution, further, the terminal 54 is specifically configured to provide description information of the terminal 54 for the home gateway 53. The home gateway 53 is specifically configured to acquire the description information from the terminal 54. The description information includes the second application identifier.

On a basis of the foregoing technical solution, further, the service template may further include: a URL of the service server 51 corresponding to the first application identifier, and a user name and password of a connection request corresponding to the first application identifier.

On a basis of the foregoing technical solution, further, the description information of the terminal 54 includes: a node description file and at least one brief description file, where the brief description file includes one second application identifier.

In a case in which the home network does not include the ZigBee® gateway 55, on a basis of the foregoing technical solution, specifically, the terminal 54 may be a ZigBee® device. The home gateway 53 is specifically configured to acquire the description information of the terminal 54 from the terminal 54 by using a command of a service discovery function. Correspondingly, the at least one service server 51 is specifically configured to deliver a command request message to the corresponding virtual client on the home gateway 53. Correspondingly, the home gateway 53 is specifically configured to cause the virtual client to send a message indicating that the virtual client is online, to the corresponding service server, cause the virtual client to receive the command request message delivered by the corresponding service server 51 and after performing protocol conversion on the command request message, send the command request message to the terminal 54, and cause the virtual client to receive a command response message returned by the terminal 54 and after performing protocol conversion on the command response message, send the command response message to the corresponding service server 51. Correspondingly, the terminal 54 is specifically configured to execute a command in the command request message from the home gateway 53, and return the command response message to the corresponding virtual client on the home gateway 53.

On a basis of the foregoing technical solution, further, the home network may further include the ZigBee® gateway 55. The terminal 54 may be a ZigBee® device. Correspondingly, the home gateway 53 is specifically configured to acquire the description information of the terminal 54 from the ZigBee® gateway 55, where the description information of the terminal 54 is uploaded to the ZigBee® gateway 55 by using a ZDP command when the terminal 54 joins a ZigBee® network. Alternatively, correspondingly, the home gateway 53 is specifically configured to invoke a device discovery report function of the ZigBee® gateway 55, so that the ZigBee® gateway 55 is specifically configured to acquire the description information of the terminal 54 and return the description information of the terminal 54 to the home gateway 53. Correspondingly, the at least one service server 51 is specifically configured to deliver a command request message to the corresponding virtual client on the home gateway 53. Correspondingly, the home gateway 53 is specifically configured to cause the virtual client to send a message indicating that the virtual client is online, to the corresponding service server, cause the virtual client to receive the command request message delivered by the corresponding service server 51 and forward the command request message to the ZigBee® gateway 55, and cause the virtual client to receive a command response message returned by the ZigBee® gateway 55 and forward the command response message to the corresponding service server 51. Correspondingly, the ZigBee® gateway 55 is specifically configured to send, after performing protocol conversion on the command request message, the command request message to the terminal 54, and send, after performing protocol conversion on the command response message, the command response message to the corresponding virtual client on the home gateway 53. Correspondingly, the terminal 54 is specifically configured to execute a command in the command request message, and return the command response message to the ZigBee® gateway 55.

In Embodiment 5 of the present invention, a gateway ACS in a home network generates a service template, where the service template includes multiple first application identifiers respectively corresponding to multiple service servers in the home network; and a home gateway in the home network creates corresponding virtual clients for the service servers in the home network according to the first application identifiers in the service template, matches a terminal with the virtual clients according to second application identifiers in description information of the terminal in the home network and the first application identifiers, maps the description information of the terminal to the matched virtual clients, and uses the virtual clients to implement information exchange between the corresponding service servers and the terminal, thereby implementing management of the terminal by the multiple service servers by using the multiple virtual clients set on the home gateway.

Figure 6:
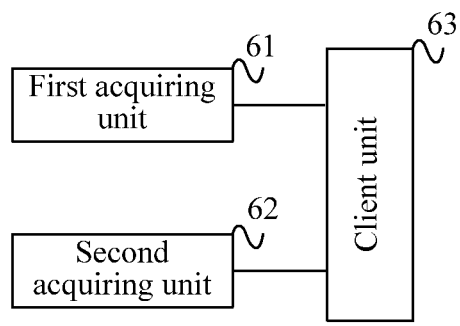
FIG. 6 is a schematic structural diagram of a home gateway according to Embodiment 6 of the present invention.

FIG. 6 is a schematic structural diagram of a home gateway according to Embodiment 6 of the present invention. As shown in FIG. 6, the home gateway includes at least a first acquiring unit 61, a second acquiring unit 62, and a client unit 63.

The first acquiring unit 61 is configured to acquire a service template from a gateway ACS. The service template is generated by the gateway ACS according to service server information received from at least one service server. The service server is corresponding to one application service, and the service template includes a first application identifier, where the first application identifier is corresponding to one application service.

The second acquiring unit 62 is configured to acquire a second application identifier from a terminal, where the second application identifier is corresponding to one application service.

The client unit 63 is configured to create, according to the service template from the first acquiring unit 61, a virtual client for the application service corresponding to the first application identifier, and when the application service corresponding to the second application identifier from the second acquiring unit 62 belongs to the application service corresponding to the first application identifier, map information corresponding to the second application identifier from the second acquiring unit 62, to the virtual client corresponding to the first application identifier, where the virtual client implements message exchange between the service server corresponding to the first application identifier and the terminal.

On a basis of the foregoing technical solution, further, the second acquiring unit 62 is specifically configured to acquire description information from the terminal, where the description information includes the second application identifier.

On a basis of the foregoing technical solution, further, the service template further includes: a URL of the service server corresponding to the first application identifier, and a user name and password of a corresponding connection request.

On a basis of the foregoing technical solution, further, the description information of the terminal includes: a node description file and at least one brief description file, where the brief description file includes the second application identifier.

On a basis of the foregoing technical solution, specifically, the terminal may be a ZigBee® device; correspondingly, the second acquiring unit 62 is specifically configured to acquire the description information of the terminal from the terminal by using a command of a service discovery function. Correspondingly, the client unit 63 is specifically configured to cause the virtual client to send a message indicating that the virtual client is online, to the corresponding service server; cause the virtual client to receive a command request message delivered by the corresponding service server and after performing protocol conversion on the command request message, send the command request message to the terminal, so that the terminal executes a command in the command request message and returns a command response message to the corresponding virtual client on the home gateway; and cause the virtual client to receive the command response message returned by the terminal and after performing protocol conversion on the command response message, send the command response message to the corresponding service server.

On a basis of the foregoing technical solution, specifically, the terminal may be a ZigBee® device, and the second acquiring unit 62 is connected to the ZigBee® device by using a ZigBee® gateway. Correspondingly, the second acquiring unit 62 is specifically configured to acquire the description information of the terminal from the ZigBee® gateway, where the description information of the terminal is uploaded to the ZigBee® gateway by using a ZDP command when the terminal joins a ZigBee® network. Alternatively, the second acquiring unit 62 is specifically configured to invoke a device discovery report function of the ZigBee® gateway, so that the ZigBee® gateway acquires the description information of the terminal and returns the description information of the terminal to the home gateway. Correspondingly, the client unit 63 is specifically configured to cause the virtual client to send a message indicating that the virtual client is online, to the corresponding service server; cause the virtual client to receive a command request message delivered by the corresponding service server and forward the command request message to the ZigBee® gateway, so that the ZigBee® gateway sends, after performing protocol conversion on the command request message, the command request message to the terminal, so that the terminal executes a command in the command request message and returns a command response message to the ZigBee® gateway, so that the ZigBee® gateway sends, after performing protocol conversion on the command response message, the command response message to the corresponding virtual client on the home gateway; and cause the virtual client to receive the command response message returned by the ZigBee® gateway and forward the command response message to the corresponding service server.

In Embodiment 6 of the present invention, a first acquiring unit of a home gateway acquires a service template generated by a gateway ACS, where the service template includes multiple first application identifiers respectively corresponding to multiple service servers; a second acquiring unit of the home gateway acquires description information of a terminal; a client unit of the home gateway creates corresponding virtual clients for the service servers according to the first application identifiers in the service template, matches the terminal with the virtual clients according to second application identifiers in the description information of the terminal and the first application identifiers, maps the description information of the terminal to the matched virtual clients, and uses the virtual clients to implement information exchange between the corresponding service servers and the terminal, thereby implementing management of the terminal by the multiple service servers by using the multiple virtual clients set on the home gateway.

Figure 7:
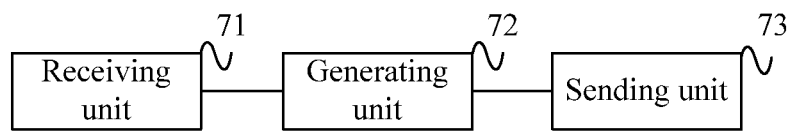
FIG. 7 is a schematic structural diagram of a gateway ACS according to Embodiment 7 of the present invention.

FIG. 7 is a schematic structural diagram of a gateway ACS according to Embodiment 7 of the present invention. As shown in FIG. 7, the gateway ACS includes at least a receiving unit 71, a generating unit 72, and a sending unit 73.

The receiving unit 71 is configured to receive service server information sent by at least one service server, where the service server is corresponding to one application service.

The generating unit 72 is configured to generate a service template according to the service server information from the receiving unit 71. The service template includes a first application identifier, where the first application identifier is corresponding to one application service.

The sending unit 73 is configured to send the service template from the generating unit 72 to a home gateway, so that the home gateway creates, according to the service template, a virtual client for the application service corresponding to the first application identifier and when an application service corresponding to a second application identifier acquired from a terminal belongs to the application service corresponding to the first application identifier, maps information corresponding to the second application identifier, to the virtual client corresponding to the first application identifier, where the virtual client on the home gateway implements message exchange between the service server corresponding to the first application identifier and the terminal.

In Embodiment 7 of the present invention, a receiving unit of a gateway ACS receives service server information from multiple service servers; a generating unit generates a service template according to the information, where the service template includes multiple first application identifiers respectively corresponding to the multiple service servers; and a sending unit sends the service template to a home gateway, so that the home gateway creates corresponding virtual clients for the service servers according to the first application identifiers in the service template, matches a terminal with the virtual clients according to second application identifiers in description information of the terminal and the first application identifiers, maps the description information of the terminal to the matched virtual clients, and uses the virtual clients to implement information exchange between the corresponding service servers and the terminal, thereby implementing management of the terminal by the multiple service servers by using the multiple virtual clients set on the home gateway.

Figure 8:
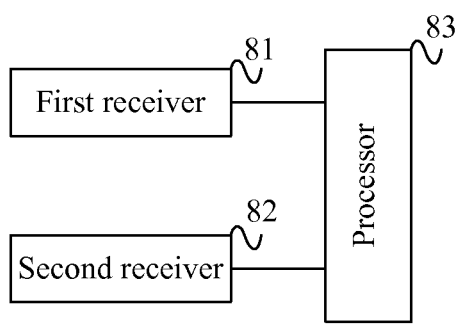
FIG. 8 is a schematic structural diagram of a home gateway according to Embodiment 8 of the present invention.

FIG. 8 is a schematic structural diagram of a home gateway according to Embodiment 8 of the present invention. As shown in FIG. 8, the home gateway includes at least a first receiver 81, a second receiver 82, and a processor 83.

The first receiver 81 is configured to acquire a service template from a gateway ACS. The service template is generated by the gateway ACS according to service server information received from at least one service server. The service server is corresponding to one application service, and the service template includes a first application identifier, where the first application identifier is corresponding to one application service.

The second receiver 82 is configured to acquire a second application identifier from a terminal, where the second application identifier is corresponding to one application service.

The processor 83 is configured to create, according to the service template from the first receiver 81, a virtual client for the application service corresponding to the first application identifier, and when the application service corresponding to the second application identifier from the second receiver 82 belongs to the application service corresponding to the first application identifier, map information corresponding to the second application identifier from the second receiver 82, to the virtual client corresponding to the first application identifier, where the virtual client implements message exchange between the service server corresponding to the first application identifier and the terminal.

On a basis of the foregoing technical solution, further, the second receiver 82 is specifically configured to acquire description information from the terminal, where the description information includes the second application identifier.

On a basis of the foregoing technical solution, further, the service template further includes: a URL of the service server corresponding to the first application identifier, and a user name and password of a corresponding connection request.

On a basis of the foregoing technical solution, further, the description information of the terminal includes: a node description file and at least one brief description file, where the brief description file includes the second application identifier.

On a basis of the foregoing technical solution, specifically, the terminal may be a ZigBee® device; correspondingly, the second receiver 82 is specifically configured to acquire the description information of the terminal from the terminal by using a command of a service discovery function. Correspondingly, the processor 83 is specifically configured to cause the virtual client to send a message indicating that the virtual client is online, to the corresponding service server; cause the virtual client to receive a command request message delivered by the corresponding service server and after performing protocol conversion on the command request message, send the command request message to the terminal, so that the terminal executes a command in the command request message and returns a command response message to the corresponding virtual client on the home gateway; and cause the virtual client to receive the command response message returned by the terminal and after performing protocol conversion on the command response message, send the command response message to the corresponding service server.

On a basis of the foregoing technical solution, specifically, the terminal may be a ZigBee® device, and correspondingly, the second receiver 82 is connected to the ZigBee® device by using a ZigBee® gateway. Correspondingly, the second receiver 82 is specifically configured to acquire the description information of the terminal from the ZigBee® gateway, where the description information of the terminal is uploaded to the ZigBee® gateway by using a ZDP command when the terminal joins a ZigBee® network. Alternatively, the second receiver 82 is specifically configured to invoke a device discovery report function of the ZigBee® gateway, so that the ZigBee® gateway acquires the description information of the terminal and returns the description information of the terminal to the home gateway. Correspondingly, the processor 83 is specifically configured to cause the virtual client to send a message indicating that the virtual client is online, to the corresponding service server; cause the virtual client to receive a command request message delivered by the corresponding service server and forward the command request message to the ZigBee® gateway, so that the ZigBee® gateway sends, after performing protocol conversion on the command request message, the command request message to the terminal, so that the terminal executes a command in the command request message and returns a command response message to the ZigBee® gateway, so that the ZigBee® gateway sends, after performing protocol conversion on the command response message, the command response message to the corresponding virtual client on the home gateway; and cause the virtual client to receive the command response message returned by the ZigBee® gateway and forward the command response message to the corresponding service server.

In Embodiment 8 of the present invention, a first receiver of a home gateway acquires a service template generated by a gateway ACS, where the service template includes multiple first application identifiers respectively corresponding to multiple service servers; a second receiver of the home gateway acquires description information of a terminal; a processor of the home gateway creates corresponding virtual clients for the service servers according to the first application identifiers in the service template, matches the terminal with the virtual clients according to second application identifiers in the description information of the terminal and the first application identifiers, maps the description information of the terminal to the matched virtual clients, and uses the virtual clients to implement information exchange between the corresponding service servers and the terminal, thereby implementing management of the terminal by the multiple service servers by using the multiple virtual clients set on the home gateway.

Figure 9:
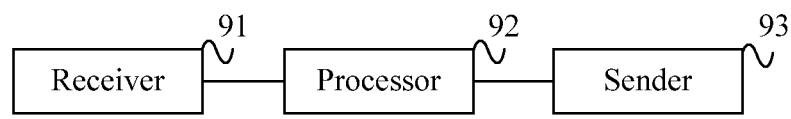
FIG. 9 is a schematic structural diagram of a gateway ACS according to Embodiment 9 of the present invention.

FIG. 9 is a schematic structural diagram of a gateway ACS according to Embodiment 9 of the present invention. As shown in FIG. 9, the gateway ACS includes at least a receiver 91, a processor 92, and a sender 93.

The receiver 91 is configured to receive service server information sent by at least one service server, where the service server is corresponding to one application service.

The processor 92 is configured to generate a service template according to the service server information from the receiver 91. The service template includes a first application identifier, where the first application identifier is corresponding to one application service.

The sender 93 is configured to send the service template from the processor 92 to a home gateway, so that the home gateway creates, according to the service template, a virtual client for the application service corresponding to the first application identifier and when an application service corresponding to a second application identifier acquired from a terminal belongs to the application service corresponding to the first application identifier, maps information corresponding to the second application identifier, to the virtual client corresponding to the first application identifier, where the virtual client on the home gateway implements message exchange between the service server corresponding to the first application identifier and the terminal.

In Embodiment 9 of the present invention, a receiver of a gateway ACS receives service server information from multiple service servers; a processor generates a service template according to the information, where the service template includes multiple first application identifiers respectively corresponding to the multiple service servers; and a sender sends the service template to a home gateway, so that the home gateway creates corresponding virtual clients for the service servers according to the first application identifiers in the service template, matches a terminal with the virtual clients according to second application identifiers in description information of the terminal and the first application identifiers, maps the description information of the terminal to the matched virtual clients, and uses the virtual clients to implement information exchange between the corresponding service servers and the terminal, thereby implementing management of the terminal by the multiple service servers by using the multiple virtual clients set on the home gateway.

It should be noted that: for brief description, the foregoing method embodiments are represented as a series of actions. However, a person skilled in the art should appreciate that the present invention is not limited to the described order of the actions, because according to the present invention, some steps may be performed in other orders or simultaneously. It should be further appreciated by a person skilled in the art that the embodiments described in this specification all belong to exemplary embodiments, and the involved actions and modules are not necessarily required by the present invention.

In the foregoing embodiments, the description of each embodiment has respective focuses. For a part that is not described in detail in an embodiment, reference may be made to related descriptions in other embodiments.

Persons of ordinary skill in the art may understand that all or a part of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:
1. A home network, comprising:
at least one service server corresponding to a server application service, wherein the at least one service server comprises:
a server processor; and
a server non-transitory computer-readable storage medium storing a server program to be executed by the server processor, the server program including instructions for:
sending service server information to a gateway auto-configuration server (ACS); and
implementing message exchange with a terminal device by using a corresponding virtual client on a home gateway;
the gateway ACS, which comprises:
a gateway ACS processor; and
a gateway ACS non-transitory computer-readable storage medium storing a gateway ACS program to be executed by the gateway ACS processor, the gateway ACS program including instructions for:

generating a service template according to the service server information received from the service server, wherein the service template comprises a first application identifier;

the terminal device, which comprises:
a terminal processor; and
a terminal non-transitory computer-readable storage medium storing a terminal program to be executed by the terminal processor, the terminal program including instructions for:
providing a second application identifier of the terminal device to the home gateway; and
implementing, through the virtual client on the home gateway, message exchange with the service server; and the home gateway, which comprises:
a gateway processor; and
a gateway non-transitory computer-readable storage medium storing a gateway program to be executed by the gateway processor, the gateway program including instructions for:
acquiring the service template from the gateway ACS;
creating, according to the service template, the virtual client for the server application service corresponding to the first application identifier;
acquiring description information of the terminal device from the terminal device, the description information including the second application identifier, wherein the second application identifier identifies a managing application service hosted on a device that is needed to manage the terminal device;
comparing the second application identifier to the first application identifier to determine whether the managing application service identified by the second application identifier is associated with the server application service corresponding to the first application identifier mapping, in response to determining that the managing application service is associated with the server application service corresponding to the first application identifier, information corresponding to the second application identifier to the virtual client by generating a terminal data model of the terminal device according to the description information of the terminal device, and embedding the terminal data model into a client data model of the virtual client; and
implementing, by the virtual client, message exchange between the service server and the terminal device after mapping the information corresponding to the second application identifier to the virtual client.

2. The home network according to claim 1, wherein the description information comprises:
a node description file; and
at least one brief description file, which comprises the second application identifier.

3. The home network according to claim 2, wherein the instructions of the server program for implementing message exchange with the terminal device comprise instructions for delivering a command request message to the virtual client;
the instructions of the gateway program for implementing, by the virtual client, message exchange, comprise instructions for:

sending to the service server a message indicating that the virtual client is online;
receiving a command request message delivered by the service server;
performing protocol conversion of the command request message to generate a converted command request message;
sending the converted command request message to the terminal;
receiving a command response message returned by the terminal in response to a command comprised in the converted command request message;
performing protocol conversion of the command response message to generate a converted command response message; and
sending the converted command response message to the service server; and the terminal program further includes instructions for:
executing the command; and
returning the command response message to the virtual client on the home gateway.

4. The home network according to claim 1, wherein the service template further comprises:
a uniform resource locator (URL) of the service server; and
a user name and password of a connection request corresponding to the first application identifier.

5. A method for terminal management in a home network, the method comprising:
acquiring, by a home gateway, a service template from a gateway auto-configuration server (ACS), wherein the service template comprises a first application identifier;
creating, by the home gateway and according to the service template, a virtual client for server application service corresponding to the first application identifier;
acquiring description information of a terminal by the home gateway from the terminal, the description information including a second application identifier, wherein the second application identifier identifies a managing application service hosted on a device that is needed to manage the terminal;
comparing, by the home gateway, the second application identifier to the first application identifier to determine whether the managing application service identified by the second application identifier is associated with the server application service;
mapping, by the home gateway and in response to determining that the managing application service is associated with the server application service corresponding to the first application identifier, information corresponding to the second application identifier to the virtual client by generating a terminal data model of the terminal according to the description information of the terminal, and embedding the terminal data model into a client data model of the virtual client; and
implementing, by the virtual client, message exchange between a service server corresponding to the first application identifier and the terminal after mapping the information corresponding to the second application identifier to the virtual client.

6. The method according to claim 5, further comprising:
acquiring, at a first time, the description information from the terminal, wherein the description information comprises the second application identifier, and wherein the first time comprises at least one of a time that occurs after the acquiring the service template and a time that occurs before the creating the virtual client; and determining, at a second time, whether the server application service corresponding to the second application identifier is associated with the server application service corresponding to the first application identifier, wherein the second time comprises at least one of a third time or a fourth time such that:
when the first time occurs after the acquiring the service template, the third time also occurs after the acquiring the service template; and
when the first time occurs before the creating the virtual client, the fourth time occurs after the creating the virtual client.

7. The method according to claim 6, wherein the terminal comprises a ZigBee device;
wherein the description information of the terminal comprises:
a node description file, and
at least one brief description file, which comprises the second application identifier; and
wherein the acquiring the description information from the terminal is performed by using a command of a service discovery function.

8. The method according to claim 5, wherein the description information comprises:
a node description file; and
at least one brief description file, which comprises the second application identifier;
wherein the terminal comprises a ZigBee device; and
wherein the acquiring the description information comprises at least one of:
acquiring the description information from a ZigBee gateway, wherein the description information is uploaded to the ZigBee gateway from the terminal by using a ZigBee device profile (ZDP) command when the terminal joins a ZigBee network; or
invoking a device discovery report function of the ZigBee gateway, so that the ZigBee gateway acquires and returns the description information from the terminal.

9. The method according to claim 8, wherein the implementing, by the virtual client, the message exchange, comprises:
sending to the service server a message indicating that the virtual client is online;
receiving a command request message delivered by the service server;
forwarding the command request message to the ZigBee gateway for protocol conversion by the Zigbee gateway and subsequent transmission to the terminal, wherein the command request message comprises a command for execution by the terminal;
receiving a converted command response message generated by a protocol conversion performed by the ZigBee gateway of a command response message returned by the terminal in response to the command; and
forwarding the converted command response message to the service server.

10. The method according to claim 5, wherein the service template further comprises:
a uniform resource locator (URL) of the service server; and
a user name and password of a connection request corresponding to the first application identifier.

11. The method according to claim 5, wherein the implementing, by the virtual client, the message exchange, comprises:
sending to the service server a message indicating that the virtual client is online;
receiving a command request message delivered by the service server;
performing protocol conversion of the command request message to generate a converted command request message having a command for execution by the terminal;
sending the converted command request message to the terminal;
receiving a command response message returned by the terminal in response to the command;
performing protocol conversion of the command response message to generate a converted command response message; and
sending the converted command response message to the service server.

12. A home gateway, comprising:
a processor; and
a non-transitory computer-readable storage medium storing a program to be executed by the processor, the program including instructions for:
acquiring a service template from a gateway autoconfiguration server (ACS), wherein the service template comprises a first application identifier;
creating, according to the service template, a virtual client for a server application service corresponding to the first application identifier;
acquiring description information of a terminal from the terminal, the description information including a second application identifier, wherein the second application identifier identifies a managing application service hosted on a device that is needed to manage the terminal;
comparing the second application identifier to the first application identifier to determine whether the managing application service identified by the second application identifier is associated with the server application service;
mapping, in response to determining that the managing application service is associated with the server application service corresponding to the first application identifier, information corresponding to the second application identifier to the virtual client by generating a terminal data model of the terminal according to the description information of the terminal, and embedding the terminal data model into a client data model of the virtual client; and
implementing, by the virtual client, message exchange between the terminal and a service server corresponding to the first application identifier after mapping the information corresponding to the second application identifier to the virtual client.

13. The home gateway according to claim 12, wherein the instructions for acquiring the description information from the terminal include instructions for acquiring the description information from the terminal using a command of a service discovery function.

14. The home gateway according to claim 13, wherein the terminal comprises a ZigBee device;
the description information of the terminal comprises:
a node description file; and
at least one brief description file, which comprises the second application identifier.

15. The home gateway according to claim 12, wherein the instructions for acquiring the second application identifier comprise at least one of:

instructions for acquiring description information of the terminal from a ZigBee gateway, wherein the description information of the terminal is uploaded to the ZigBee gateway by using a ZigBee device profile (ZDP) command when the terminal joins a ZigBee network; or instructions for invoking a device discovery report function of a ZigBee gateway, so that the ZigBee gateway acquires and returns the description information of the terminal;

the description information comprises:
a node description file; and
at least one brief description file, which comprises the second application identifier; and the terminal comprises a ZigBee device.

16. The home gateway according to claim 15, wherein the instructions for implementing, by the virtual client, the message exchange, comprise instructions for:

sending to the service server a message indicating that the virtual client is online;
receiving a command request message delivered by the service server;
forwarding the command request message to the ZigBee gateway for protocol conversion by the Zigbee gateway and subsequent transmission to the terminal, wherein the command request message comprises a command for execution by the terminal;
receiving a converted command response message generated by a protocol conversion performed by the ZigBee gateway of a command response message returned by the terminal in response to the command; and
forwarding the converted command response message to the service server.

17. The home gateway according to claim 12, wherein the service template further comprises:
a uniform resource locator URL of the service server, and
a user name and password of a connection request corresponding to the first application identifier.

18. The home gateway according to claim 12, wherein the instructions for implementing, by the virtual client, the message exchange, comprise instructions for:
sending to the service server a message indicating that the virtual client is online;
receiving a command request message delivered by the service server;
performing protocol conversion on the command request message to generate a converted command request message having a command for execution by the terminal;
sending the converted command request message to the terminal;
receiving a command response message returned by the terminal in response to the command;
performing protocol conversion on the command response message to generate a converted command response message; and
sending the converted command response message to the service server.

19. A method for terminal management in a home network, comprising:
receiving, by a gateway auto-configuration server (ACS), service server information sent by a service server, wherein the service server hosts, and corresponds to, a server application service;

generating, by the ACS, a service template according to the service server information, wherein the service template comprises a first application identifier; and
sending the service template, by the ACS to a home gateway, wherein the sending the service template to the home gateway causes the home gateway to create, according to the service template, a virtual client for the server application service, and acquire description information of a terminal from the terminal, the description information including a second application identifier, wherein the second application identifier identifies a managing application service hosted on a device that is needed to manage the terminal, and wherein the sending the service template to the home gateway further causes the home gateway to compare the second application identifier to the first application identifier to determine whether the managing application service identified by the second application identifier acquired from a terminal is associated with the server application service, and map, in response to determining that the managing application service is associated with the server application service corresponding to the first application identifier, information corresponding to the second application identifier to the virtual client by generating a terminal data model of the terminal according to the description information of the terminal, and embedding the terminal data model into a client data model of the virtual client, and further to implement message exchange between the service server and the terminal after mapping the information corresponding to the second application identifier to the virtual client.

20. A gateway auto-configuration server (ACS), comprising:
a processor; and
a non-transitory computer-readable storage medium storing a program to be executed by the processor, the program including instructions for:
receiving service server information sent by a service server, wherein the service server corresponds to a server application service;
generating a service template according to the service server information, wherein the service template comprises a first application identifier; and
sending the service template to a home gateway, wherein the sending the service template to the home gateway causes the home gateway to create, according to the service template, of a virtual client for the server application service, and acquire description information of a terminal from the terminal, the description information including a second application identifier, wherein the second application identifier identifies a managing application service hosted on a device that is needed to manage the terminal, and wherein the sending the service template to the home gateway further causes the home gateway to compare the second application identifier to the first application identifier to determine whether the managing application service identified by the second application identifier acquired from a terminal is associated with the server application service, and map, in response to determining that the managing application service is associated with the server application service corresponding to the first application identifier, information corresponding to the second application identifier to the virtual client by generating a terminal data model of the terminal according to the description information of the terminal, and embedding the terminal data model into a client data model of the virtual client and embedding the terminal data model into a client data model of the virtual client, and further to implement message exchange between the service server and the terminal after mapping the information corresponding to the second application identifier to the virtual client.

* * * * *